United States Patent
Balakrishnan et al.

(10) Patent No.: US 12,407,557 B2
(45) Date of Patent: Sep. 2, 2025

(54) POWER EFFICIENT CREST FACTOR REDUCTION

(71) Applicant: TEXAS INSTRUMENTS INCORPORATED, Dallas, TX (US)

(72) Inventors: Jaiganesh Balakrishnan, Bengaluru (IN); Aswath Vs, Bengaluru (IN); Sriram Murali, Bengaluru (IN); Sreenath Narayanan Potty, Bengaluru (IN); Sundarrajan Rangachari, Bengaluru (IN); Girish Nadiger, Bengaluru (IN); Kapil Kumar, New Delhi (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/399,278

(22) Filed: Dec. 28, 2023

(65) Prior Publication Data
US 2024/0372767 A1  Nov. 7, 2024

(30) Foreign Application Priority Data
May 5, 2023  (IN) .............................. 202341031976

(51) Int. Cl.
*H04L 27/26* (2006.01)

(52) U.S. Cl.
CPC .................................. *H04L 27/2614* (2013.01)

(58) Field of Classification Search
CPC ........................ H04L 27/2614; H04L 27/2623
See application file for complete search history.

(56) References Cited

U.S. PATENT DOCUMENTS

| | | | |
|---|---|---|---|
| 10,727,880 B1 * | 7/2020 | Pratt | H04B 3/04 |
| 11,770,284 B1 * | 9/2023 | Janani | H04L 27/00 |
| | | | 375/295 |

* cited by examiner

*Primary Examiner* — David S Huang
(74) *Attorney, Agent, or Firm* — Mandy Barsilai Fernandez; Frank D. Cimino

(57) ABSTRACT

Crest factor reduction circuitry includes: a peak neighborhood analyzer; peak detection circuitry and a controller. The peak neighborhood analyzer is configured to: receive an input signal; analyze the input signal to determine whether a peak larger than a target threshold is expected within an interval; and provide a first control signal responsive to determining that a peak larger than the target threshold is expected within the interval. The controller is configured to: receive the first control signal; and gate a clock or data to the peak detection circuitry responsive to the first control signal.

20 Claims, 10 Drawing Sheets

POWER EFFICIENT CREST FACTOR REDUCTION

CROSS REFERENCE TO RELATED APPLICATION

The present application claims priority to India Provisional Application No. 202341031976, titled "LOW POWER ARCHITECTURE FOR CREST FACTOR REDUCTION", filed on May 5, 2023, which is hereby incorporated by reference in its entirety.

BACKGROUND

An example base station has a transmitter and a power amplifier. If the transmit signal from the transmitter has a high peak-to-average power ratio (PAR), the output root-mean-square (RMS) power and the efficiency of the power amplifier is reduced. Such power amplifiers are non-linear and may be affected by out-of-band emissions and transmission spectral mask violations. To improve linearity of power amplifiers, the transmitter may condition a transmit signal using, for example, Crest Factor Reduction (CFR) and Digital Pre-Distortion (DPD), where CFR reduces the Peak-to-Average power Ratio (PAR) of the transmit signal prior to DPD. Although CFR can improve a power amplifier's dynamic range and increase power amplifier efficiency and RMS power, the power consumption of CFR operations can be significant.

SUMMARY

In an example, a circuit includes crest factor reduction circuitry. The crest factor reduction (CFR) circuitry includes: a peak neighborhood analyzer having a first terminal and a second terminal; peak detection circuitry having a first terminal, a second terminal, and a third terminal; and a controller having a first terminal and a second terminal. The first terminal of the controller is coupled to the second terminal of the peak neighborhood analyzer. The second terminal of the controller is coupled to the second terminal of the peak detection circuitry. The peak neighborhood analyzer is configured to: receive an input signal at the first terminal of the peak neighborhood analyzer; analyze the input signal to determine whether a peak larger than a target threshold is expected within an interval; and provide a first control signal at the second terminal of the peak neighborhood analyzer responsive to determining that a peak larger than the target threshold is expected within the interval. The controller is configured to: receive the first control signal at the first terminal of the controller; and gate a clock or data to the peak detection circuitry responsive to the first control signal.

In another example, a transmitter includes CFR circuitry. The CFR circuitry includes: peak detection circuitry having a first terminal, a second terminal, and a third terminal; and peak cancellation having a first terminal, a second terminal, and a third terminal. The first terminal of the peak cancellation circuitry is coupled to the third terminal of the peak detection circuitry. The peak cancellation circuitry includes: envelope calculation circuitry; excess peak calculation circuitry; a delay line; and a multiplier. The envelope calculation circuitry has a first terminal and a second terminal. The first terminal of the envelope calculation circuitry is coupled to the first terminal of the peak cancellation circuitry. The excess peak calculation circuitry has a first terminal and a second terminal. The first terminal of the excess peak calculation circuitry is coupled to the second terminal of the envelope calculation circuitry. The delay line has a first terminal and a second terminal. The first terminal of the delay line is coupled to the first terminal of the peak cancellation circuitry. The multiplier has a first terminal, a second terminal, and a third terminal. The first terminal of the multiplier is coupled to the second terminal of the delay line. The second terminal of the multiplier is coupled to the second terminal of the excess peak calculation circuitry.

In yet another example, a method includes: receiving a transmit signal; selectively enabling peak detection based on a peak absence prediction for the transmit signal; when enabled, performing peak detection by comparing a peak of the transmit signal to a peak limit; calculating an excess peak portion of the peak relative to the peak limit; applying a correction to the peak based on the excess peak portion; and providing an updated transmit signal with the corrected peak.

DETAILED DESCRIPTION

Figure 1:
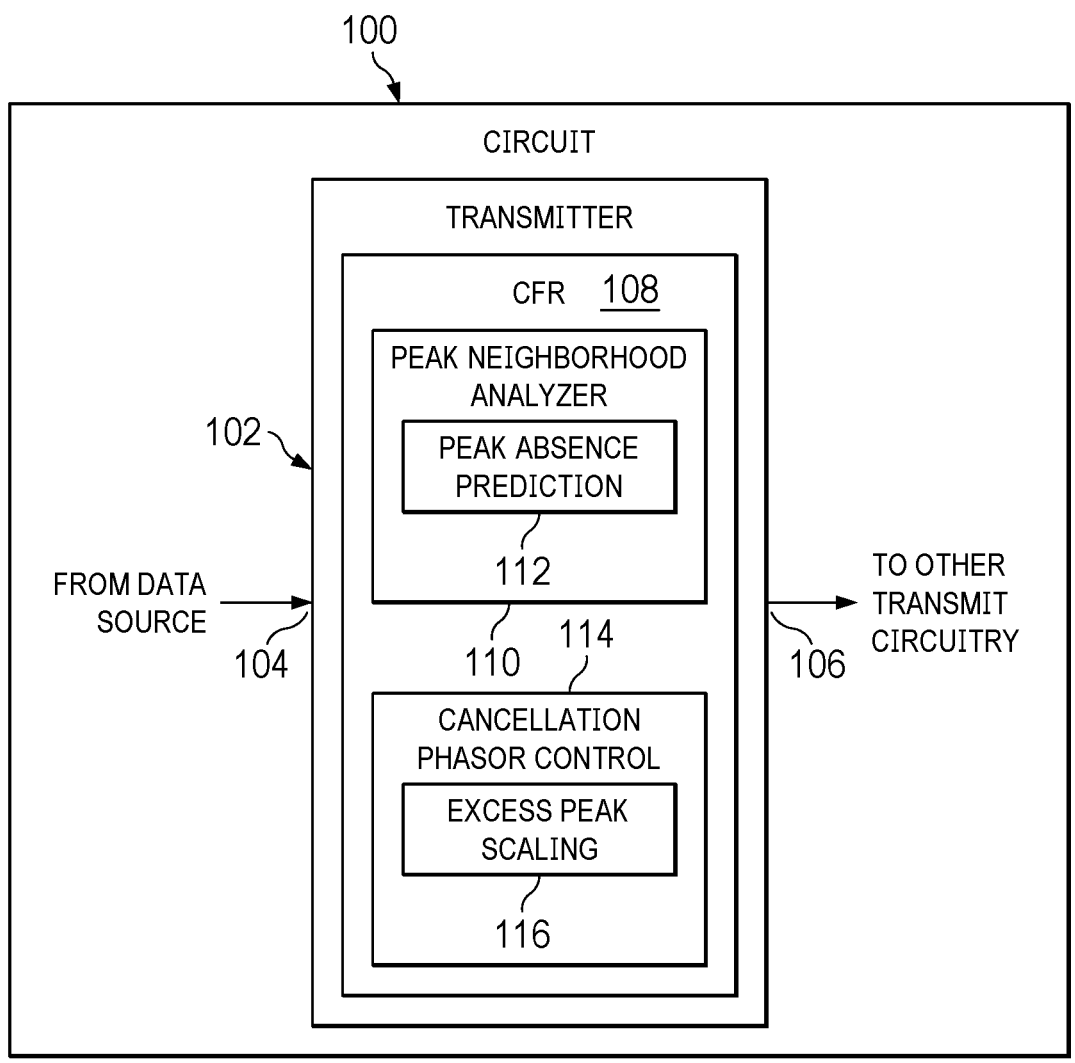
FIG. 1 is a block diagram showing an example circuit.

The same reference numbers or other reference designators are used in the drawings to designate the same or similar features. Such features may be the same or similar either by function and/or structure.

Described herein are power efficient Crest Factor Reduction (CFR) topologies and control options. In some examples, CFR circuitry may include one or more CFR stages. Each CFR stage includes a peak neighborhood analyzer, interpolated envelope computation circuitry, peak detection circuitry, and peak cancellation circuitry. The peak neighborhood analyzer operates to: determine whether there are any significant peaks within an upcoming interval, window, or related number of input signal samples (sometimes referred to as transmit signal samples herein); and provide a control signal responsive to determining that there is no significant peak within the upcoming interval, window, or related number of input signal samples. In some examples, the input signal (sometimes referred to as a transmit signal herein) may be a 4G or 5G signal based on orthogonal frequency division multiplexing (OFDM) modulation.

In the described examples, different techniques to determine the presence or absence of significant peaks may be used by the peak neighborhood analyzer. In some examples, a significant peak is identified by: calculating envelope values for input signal samples for a baseband interface rate; and comparing the envelope values to a threshold (sometimes referred to herein as a peak absence prediction threshold) to obtain comparison results. If the comparison results indicate a number of consecutive envelope values are below the threshold, no significant peak within the upcoming interval, window, or related number of input signal samples is assumed and the control signal is provided.

In response to the control signal being provided by the peak neighborhood analyzer, the interpolated envelope computation circuitry and/or the peak detection circuitry are disabled. For example, data and/or clocks for the interpolated envelope computation circuitry and/or the peak detection circuitry may be gated temporarily based on the interval, window, or related number of input signal samples. If the peak neighborhood analyzer determines that there is a significant peak within the interval, window, or the related number of input signal samples, the interpolated envelope computation circuitry and the peak detection circuitry are not disabled and operate to determine whether there are any peaks greater than a peak limit. If a detected peak is greater than the peak limit, the peak cancellation circuitry applies a correction so that the detected peak is reduced to below the peak limit. In some examples, the peak cancellation circuitry operates to: determine an excess peak portion of a detected peak relative to the peak limit; scale a complex baseband interpolated sample $y_i$ corresponding to the peak responsive to the excess peak portion to generate a cancellation phasor; generate a peak cancellation pulse responsive to the cancellation phasor and a peak cancellation waveform; and add the peak cancellation pulse to a latency (delay) matched version of the input signal to apply peak correction or limiting.

In some examples, multiple stages of CFR circuitry (e.g., up to 3 stages) may be used to perform peak correction or peak limiting operations. Each stage may include a respective peak neighborhood analyzer, respective interpolated envelope computation circuitry, respective peak detection circuitry, and respective peak cancellation circuitry. With the described peak neighborhood analyzer and/or the described peak cancellation circuitry, power consumption of CFR operations is reduced relative to other CFR techniques. In some examples, application-specific hardware may be used to perform each of the CFR operations described herein. In other examples, at least some of the CFR operations may be performed using a processor and a memory that stores related instructions.

Figure 3:
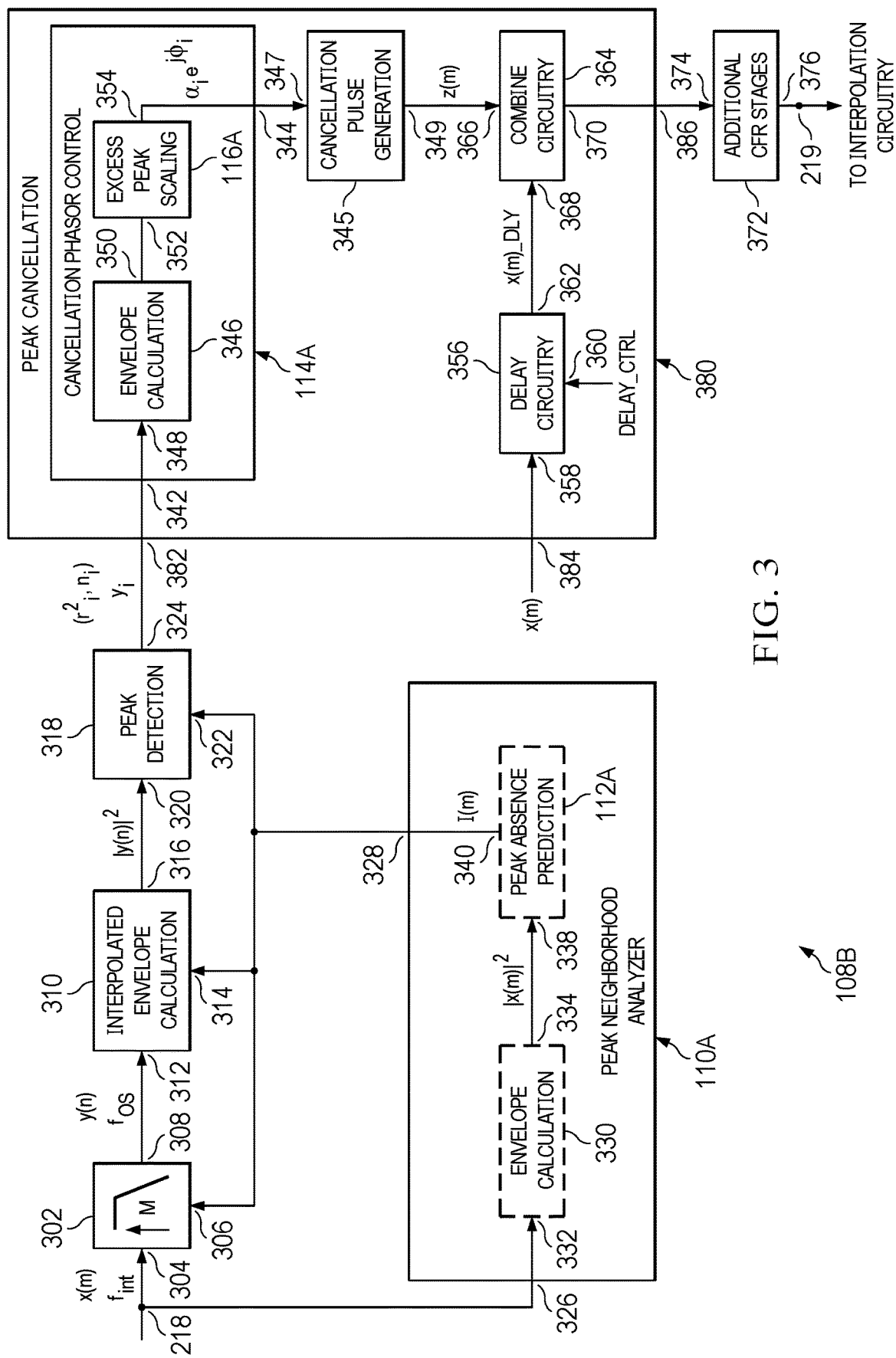
FIG. 3 is a diagram showing example Crest Factor Reduction (CFR) circuitry.
Figure 4:
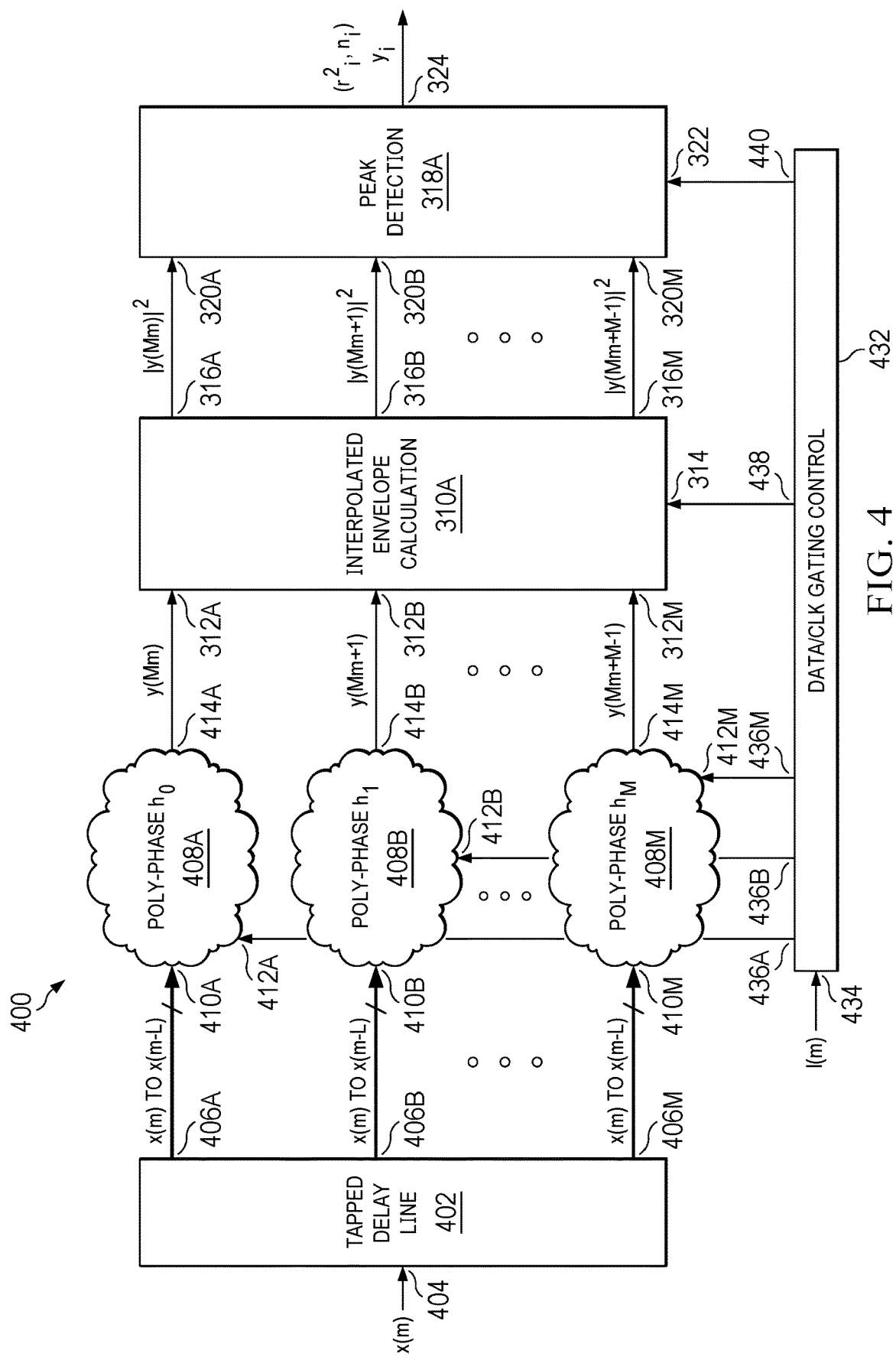
FIG. 4 is a diagram showing another example CFR circuitry.
Figure 7:
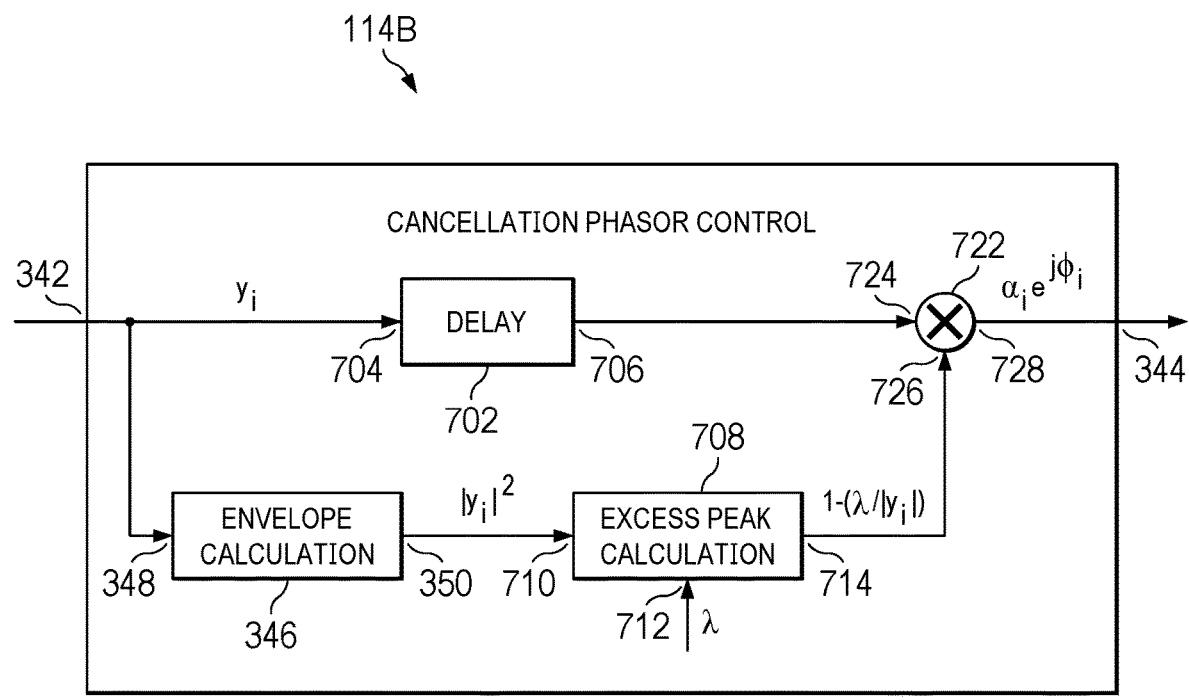
FIG. 7 is a block diagram of example cancellation phasor control circuitry.

In FIGS. 3, 4, and 7, example CFR circuitry is described. Such CFR circuitry may be categorized as digital signal processing/conditioning circuitry. In some examples, the example CFR circuitry of FIGS. 3, 4, and 7 is implemented using digital hardware. Example digital hardware that may be used for CFR circuitry includes combinational logic (e.g., adders/subtractors, multipliers, counters, comparators and logic gates including AND/OR/NOT gates), sequential logic (e.g., flip-flops, latches, delay chains), and/or memory elements (e.g., random-access memory (RAM) elements and/or read-only memory (ROM) elements). The digital hardware used for CFR circuitry may be part of one or more integrated circuits (ICs). As another option, digital hardware for CFR circuitry may be synthesized and implemented using Flexible Programmable Gate Arrays (FPGAs). As another option, processor/firmware/software elements may be used to perform some or all CFR operations. Without limitation, dedicated digital hardware may be preferred over processor/firmware/software elements depending on the target speed of individual and/or collective CFR operations.

FIG. 1 is a block diagram showing an example circuit 100. In some examples, the circuit 100 is part of the circuitry of a base station circuit or data transmission device. As shown, the circuit 100 includes a transmitter 102 having a first terminal 104 and a second terminal 106. The transmitter 102 includes CFR circuitry 108. The CFR circuitry 108 includes a peak neighborhood analyzer 110 and cancellation phasor control circuitry 114. In some examples, the CFR circuitry 108 may also include other components such as interpolated envelope computation circuitry, peak detection circuitry, and/or peak cancellation circuitry (see e.g., the components of FIGS. 3, 4, and 7). In some examples, the CFR circuitry 108 includes multiple CFR stages (e.g., up to 3 stages), where each CFR stage includes a respective peak neighborhood analyzer, respective interpolated envelope computation circuitry, respective peak detection circuitry, and respective peak cancellation circuitry.

The peak neighborhood analyzer 110 operates to: determine whether there are any significant peaks within an upcoming interval of an input signal sample; and provide a control signal responsive to determining that there is no significant peak within the interval. If there is a significant peak within the interval, the CFR circuitry 108 operates to: detect whether the significant peak is greater than a peak limit. In some examples, the peak neighborhood analyzer 110 includes peak absence prediction circuitry 112 to determine whether there are any significant peaks within the interval. In some examples, the peak absence prediction circuitry 112 operates to: obtain input signal samples related to the interval; calculate envelope values of the input signal samples, compare the input signal samples to a significant peak pattern or threshold to obtain comparison results; and provide the control signal based on the comparison results indicating there is no significant peak within the interval.

If a detected peak is greater than the peak limit, the cancellation phasor control circuitry 114 operates to: determine an excess peak portion of a detected peak relative to the peak limit; scale a sample related to the peak responsive to the excess peak portion to generate a cancellation phasor. In some examples, the cancellation phasor is used to scale a peak cancellation waveform to generate a peak cancellation pulse. The peak cancellation pulse is added to a latency (delay) matched version of the input signal to apply peak correction or limiting. In some examples, the CFR circuitry 108 repeats the same or similar CFR operations for each of multiple CFR stages.

In some examples, the cancellation phasor control circuitry 114 includes excess peak scaling circuitry 116 that operates to: determine an excess peak portion of a detected peak; receive a complex baseband interpolated sample $y_i$ corresponding to the detected peak; and scale the complex baseband interpolated sample responsive to the excess peak portion to generate a cancellation phasor. In some examples, the excess peak scaling circuitry 116 uses a look-up table (LUT) indexed using a detected peak sample to expedite determining the excess peak portion of the detected peak relative to the peak limit. Other CFR options and details are described hereafter.

With the CFR circuitry 108, the transmitter 102 receives an input signal at the first terminal 104, where the input signal may include peaks greater than the peak limit. As part of conditioning the input signal for subsequent transmission operations, the transmitter 102 uses the CFR circuitry 108 to reduce the amplitude of peaks to below the peak limit. In different examples, the peak limit may vary to achieve a target Peak-to-Average power Ratio (PAR) of a baseband signal prior to other operations of the transmitter 102.

Figure 2:
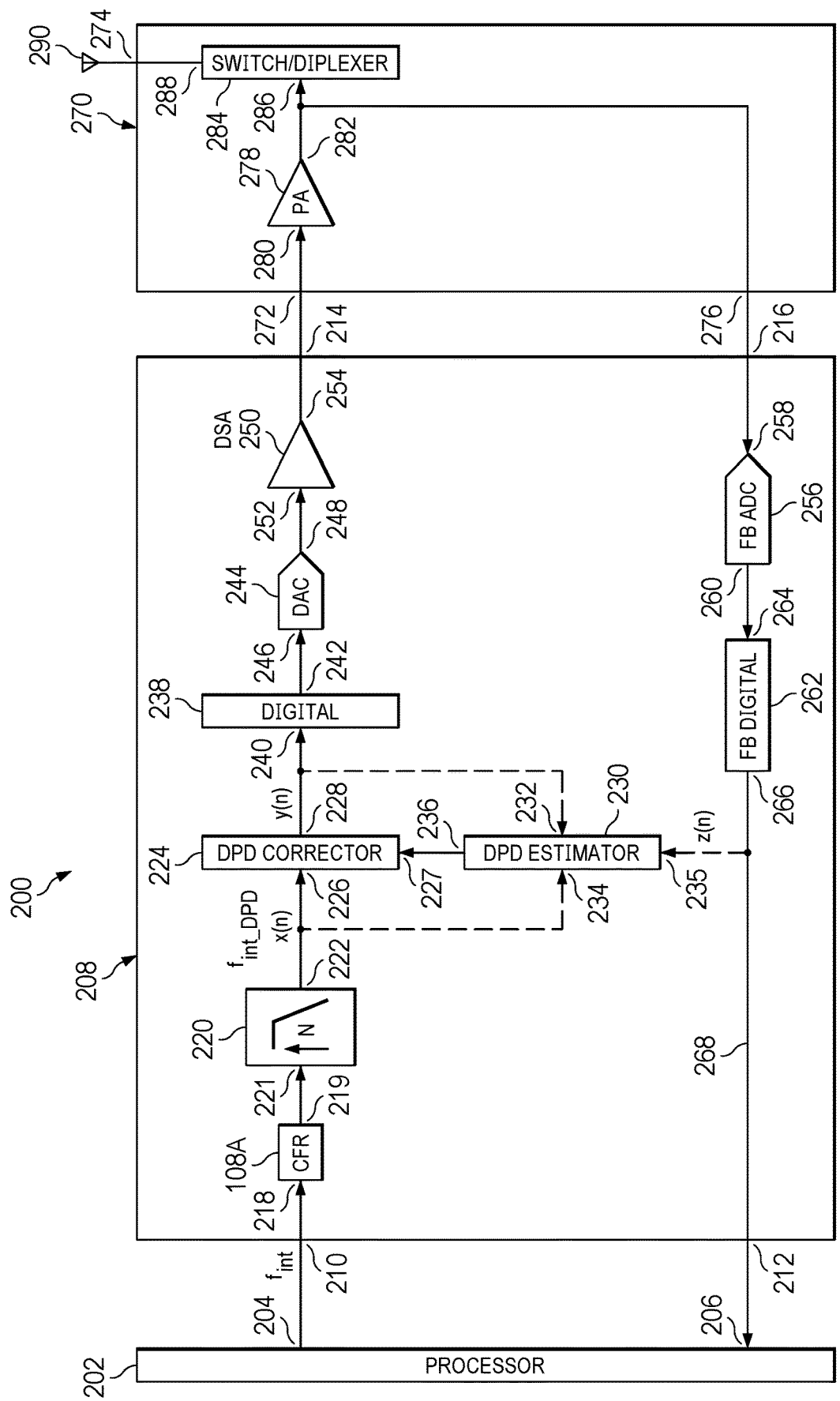
FIG. 2 is a diagram showing another example circuit.

FIG. 2 is a diagram showing another example circuit 200. As shown, the circuit 200 includes a processor 202, transmitter circuitry 208, power amplifier circuitry 270, and an antenna 290. The processor 202 has a first terminal 204 and a second terminal 206. The transmitter circuitry 208 has a first terminal 210, a second terminal 212, a third terminal 214, and a fourth terminal 216. The power amplifier circuitry 270 has a first terminal 272, a second terminal 274, and a third terminal 276.

The transmitter circuitry 208 includes CFR circuitry 108A, interpolation circuitry 220, Digital Pre-Distortion (DPD) corrector circuitry 224, DPD estimator circuitry 230, digital circuitry 238, a digital-to-analog converter (DAC) 244, a digital step attenuator (DSA) 250, a feedback analog-to-digital converter (ADC) 256, and feedback digital circuitry 262. The CFR circuitry 108A is an example of the CFR circuitry 108 in FIG. 1. In the example of FIG. 2, some or all of the transmitter circuitry 208 is included in the transmitter 102 of FIG. 1. As shown, the CFR circuitry 108A has a first terminal 218 and a second terminal 219. The interpolation circuitry 220 has a first terminal 221 and a second terminal 222. The DPD corrector circuitry 224 has a first terminal 226, a second terminal 227, and a third terminal 228. The DPD estimator circuitry 230 has a first terminal 232, a second terminal 234, a third terminal 235, and a fourth terminal 236. The digital circuitry 238 has a first terminal 240 and a second terminal 242. The DAC 244 has a first terminal 246 and a second terminal 248. The DSA 250 has a first terminal 252 and a second terminal 254.

In the example of FIG. 2, the power amplifier circuitry 270 includes a power amplifier 278 and switch/diplexer circuitry 284. The power amplifier 278 has a first terminal 280 and a second terminal 282. The switch/diplexer circuitry 284 has a first terminal 286 and a second terminal 288.

In the example of FIG. 2, the first terminal 204 of the processor 202 is coupled to the first terminal 210 of the transmitter circuitry 208. The second terminal 206 of the processor 202 is coupled to the second terminal 212 of the transmitter circuitry 208. The third terminal 214 of the transmitter circuitry 208 is coupled to the first terminal 272 of the power amplifier circuitry 270. The fourth terminal 216 of the transmitter circuitry 208 is coupled to the third terminal 276 of the power amplifier circuitry 270. The second terminal 274 of the power amplifier circuitry 270 is coupled to the antenna 290.

The first terminal 210 of the transmitter circuitry 208 is coupled to the first terminal 218 of the CFR circuitry 108A. The second terminal 219 of the CFR circuitry 108A is coupled to the first terminal of the interpolation circuitry 220. The second terminal 222 of the interpolation circuitry 220 is coupled to the first terminal 226 of the DPD corrector circuitry 224 and to the second terminal 234 of the DPD estimation circuitry 230. The second terminal of the DPD corrector circuitry 224 is coupled to the fourth terminal 236 of the DPD estimation circuitry 230. The third terminal 228 of the DPD corrector circuitry 224 is coupled to the first terminal 240 of the digital circuitry 238 and to the first terminal 232 of the DPD estimation circuitry 230. The second terminal 242 of the digital circuitry 238 is coupled to the first terminal 246 of the DAC 244. The second terminal 248 of the DAC is coupled to the first terminal 252 of the DSA 250. The second terminal 254 of the DSA 250 is coupled to the third terminal 214 of the transmitter circuitry 208. The fourth terminal 216 of the transmitter circuitry 208 is coupled to the first terminal 258 of the feedback ADC 256. The second terminal 260 of the feedback ADC 256 is coupled to the first terminal 264 of the feedback digital circuitry 262. The second terminal 266 of the feedback digital circuitry 262 is coupled to the second terminal 212 of the transmitter circuitry 208 and to the third terminal 235 of the DPD estimator circuitry 230.

The first terminal 272 of the power amplifier circuitry 270 is coupled to the first terminal 280 of the power amplifier 278. The second terminal 282 of the power amplifier 278 is coupled to the third terminal 276 of the power amplifier circuitry 270 and to the first terminal 286 of the switch/diplexer circuitry 284. The second terminal 288 of the switch/diplexer circuitry 284 is coupled to the second terminal 274 of the power amplifier circuitry 270.

The processor 202 operates to: prepare a transmit baseband signal; and provide the transmit baseband signal to the first terminal 204 responsive to a particular transmission protocol. In some examples, the transmit baseband signal is a 4G or 5G signal based on OFDM modulation. In other examples, the transmit baseband signal may be a complex baseband signal corresponding to other transmission standards, such as wireless local-area network (WLAN). In some examples, the transmit baseband signal provided by the processor 202 is based in part on feedback 268 received at the second terminal 206 of the processor 202. In other examples, the feedback 268 to the processor 202 is not used and may be omitted.

The transmitter circuitry 208 operates to: receive the transmit baseband signal at the first terminal 210; condition the transmit baseband signal using the CFR circuitry 108A; the interpolation circuitry 220, the DPD estimator circuitry 230, the DPD corrector circuitry 224, and the digital circuitry 238; convert the conditioned transmit signal to an analog transmit signal using the DAC 244; apply a gain or attenuation to the analog transmit signal using the DSA 250; and provide the buffered analog transmit signal to the third terminal 214. The transmitter circuitry 208 also operates to receive the power amplifier output at the fourth terminal 216; digitize the power amplifier output using the feedback ADC 256; adjust the digitized power amplifier output using the feedback digital circuitry 262; and provide the adjusted digitized power amplifier output to the second terminal 212. In some examples, the CFR circuitry 108A performs the operations described for the CFR circuitry 108B in FIG. 3. In some examples, the interpolation circuitry 220 includes a chain of filters that operate to increase the sampling rate of the received signal from an input sampling rate to a higher sampling rate for use by the DPD estimator circuitry 230 and the DPD corrector circuitry 224. With the transmitter circuitry 208 of FIG. 2, power consumption of CFR operations is reduced responsive to the operations of the peak neighborhood analyzer 110 and the cancellation phasor control circuitry 114 described in FIG. 1. Additional CFR options and details are described herein.

The power amplifier circuitry 270 operates to: receive the buffered analog transmit signal at the first terminal 272; amplify the buffered analog transmit signal using the power amplifier 278; selectively provide the amplified transmit signal to the second terminal 274; and provide the amplified transmit signal to the third terminal 276.

FIG. 3 is a diagram showing example CFR circuitry 108B. The CFR circuitry 108B is an example of the CFR circuitry 108 in FIG. 1 and the CFR circuitry 108A in FIG. 2. In the example of FIG. 3, the CFR circuitry 108B has the first terminal 218 and the second terminal 219 described in FIG. 2. In some examples, the CFR circuitry 108B includes interpolation circuitry 302, interpolated envelope calculation circuitry 310, peak detection circuitry 318, a peak neighborhood analyzer 110A, peak cancellation circuitry 380, and additional CFR stages 372.

The peak neighborhood analyzer 110A is an example of the peak neighborhood analyzer 110 of FIG. 1. In the example of FIG. 3, the peak neighborhood analyzer 110A includes envelope calculation circuitry 330 and peak absence prediction circuitry 112A. The peak absence prediction circuitry 112A is an example of the peak absence prediction circuitry 112A in FIG. 1. The cancellation phasor control circuitry 114A is an example of the cancellation phasor control circuitry 114 of FIG. 1.

As shown, the interpolation circuitry 302 has a first terminal 304, a second terminal 306, and a third terminal 308. The interpolated envelope calculation circuitry 310 has a first terminal 312, a second terminal 314, and a third terminal 316. The peak detection circuitry 318 has a first terminal 320, a second terminal 322, and a third terminal 324. The peak neighborhood analyzer 110A has a first terminal 326 and a second terminal 328. The envelope calculation circuitry 330 has a first terminal 332 and a second terminal 334. The peak absence prediction circuitry 112A has a first terminal 338 and a second terminal 340.

The peak cancellation circuitry 380 has a first terminal 382, a second terminal 384, and a third terminal 386. In the example of FIG. 3, the peak cancellation circuitry 380 includes the cancellation phasor control circuitry 114A, cancellation pulse generation circuitry 345, delay circuitry 356, and combine circuitry 364. The cancellation phasor control circuitry 114A includes envelope calculation circuitry 346 and excess peak scaling circuitry 116A. The excess peak scaling circuitry 116A is an example of the excess peak scaling circuitry 116 in FIG. 1.

The cancellation phasor control circuitry 114A has a first terminal 342 and a second terminal 344. The envelope calculation circuitry 346 has a first terminal 348 and a second terminal 350. The excess peak scaling circuitry 116A has a first terminal 352 and a second terminal 354. The cancellation pulse generation circuitry 345 has a first terminal 347 and a second terminal 349. The delay circuitry 356 has a first terminal 358, a second terminal 360, and a third terminal 362. The combine circuitry 364 has a first terminal 366, a second terminal 368, and a third terminal 370. The additional CFR stages 372 have a first terminal 374 and a second terminal 376.

In the example of FIG. 3, the first terminal 218 of the CFR circuitry 108B is coupled to the first terminal 304 of the interpolation circuitry 302, the first terminal 326 of the peak neighborhood analyzer 110A, and the second terminal 384 of the peak cancellation circuitry 380. The second terminal 306 of the interpolation circuitry 302 is coupled to the second terminal 328 of the peak neighborhood analyzer 110A. The third terminal 308 of the interpolation circuitry 302 is coupled to the first terminal 312 of the interpolated envelope calculation circuitry 310. The second terminal 314 of the interpolated envelope calculation circuitry 310 is coupled to the second terminal 328 of the peak neighborhood analyzer 110A. The third terminal 316 of the interpolated envelope calculation circuitry 310 is coupled to the first terminal 320 of the peak detection circuitry 318. The second terminal 322 of the peak detection circuitry 318 is coupled to the second terminal 328 of the peak neighborhood analyzer 110A. The third terminal 324 of the peak detection circuitry 318 is coupled to the first terminal 382 of the peak cancellation circuitry 380.

In the example of FIG. 3, the first terminal 326 of the peak neighborhood analyzer 110A is coupled to the first terminal 332 of the envelope calculation circuitry 330. The second terminal 334 of the envelope calculation circuitry 330 is coupled to the first terminal 338 of the peak absence prediction circuitry 112A. The second terminal 340 of the peak absence prediction circuitry 112A is coupled to the second terminal 328 of the peak neighborhood analyzer 110A.

The first terminal 382 of the peak cancellation circuitry 380 is coupled to the first terminal 342 of the cancellation phasor control circuitry 114A. The first terminal 348 of the envelope calculation circuitry 346 is coupled to the first terminal 342 of the cancellation phasor control circuitry 114A. The second terminal 350 of the envelope calculation circuitry 346 is coupled to the first terminal 352 of the excess peak scaling circuitry 116A. The second terminal 354 of the excess peak scaling circuitry 116A is coupled to the second terminal of the cancellation phasor control circuitry 114A. The second terminal 344 of the cancellation phasor control circuitry 114A is coupled to the first terminal 347 of the cancellation pulse generation circuitry 345. The second terminal 349 of the cancellation pulse generation circuitry 345 is coupled to the first terminal 366 of the combine circuitry 364. The second terminal 368 of the combine circuitry 364 is coupled to the third terminal 362 of the delay circuitry 356. The first terminal 358 of the delay circuitry 356 is coupled to the second terminal 384 of the peak cancellation circuitry 380. In some examples, the second terminal 360 of the delay circuitry 356 receives a delay control signal (DELAY_CTRL).

In some examples, DELAY_CTRL is provided by delay estimation circuitry included with the peak cancellation circuitry and/or the CFR circuitry 108A. In some examples, DELAY_CTRL is a predetermined signal that accounts for delay of the interpolation circuitry 302, the interpolated envelope calculation circuitry 310, the peak detection circuitry 318, the cancellation phasor control circuitry 114A, and the cancellation pulse generation circuitry 345. In other examples, DELAY_CTRL is based on actively monitoring delay of the interpolation circuitry 302, the interpolated envelope calculation circuitry 310, the peak detection circuitry 318, the cancellation phasor control circuitry 114A, and the cancellation pulse generation circuitry 345. With DELAY_CTRL, the delay circuitry 356 operates to provide a delayed version of x(m) (the delayed version given as x(m)_DLY herein), where x(m)_DLY is a latency (delay) matched version of x(m) to align the peak of x(m) with z(m) from the cancellation pulse generation circuitry 345.

As shown, the second terminal 368 of the combine circuitry 364 is coupled to the third terminal 362 of the delay circuitry 356 and receives x(m)_DLY. The third terminal 370 of the combine circuitry 364 is coupled to the first terminal 374 of the additional CFR stages 372. The second terminal 376 of the additional CFR stages 372 is coupled to the second terminal 219 of the CFR circuitry 108B.

In some examples, the peak neighborhood analyzer 110A operates to: receive an input signal x(m) having a baseband interface sampling frequency ($f_{int}$) at the first terminal 326; calculate an envelope value of x(m) using the envelope calculation circuitry 330; and provide the calculated envelope value of x(m) to the second terminal 334. In some examples, the calculated envelope value of x(m) is given as $|x(m)|^2$. The peak absence prediction circuitry 112A is configured to: receive the calculated envelope value at the first terminal 338; compare the calculated envelope value to a threshold to obtain comparison results; and provide a control signal l(m) at the second terminal 328 responsive to the comparison results.

The interpolation circuitry 302 operates to: receive x(m) at the first terminal 304; receive l(m) at the second terminal 306; and selectively provide an interpolated signal y(n) at the third terminal 308 responsive to x(m) and l(m), where y(n) has an oversampling frequency $f_{OS}$. In some examples, $f_{OS}$ is 1× to 4× greater than $f_{int}$. In some examples, l(m) is a control signal that selectively enables the interpolation circuitry 302 responsive to the operations of the peak neighborhood analyzer 110A. l(m) may be used directly with circuitry of the interpolation circuitry 302 if enable/disable is available. As another option, l(m) may be provided to data/clock gating control circuitry (e.g., the data/clock gating control circuitry 432 in FIG. 4) to stop data and/or clocks from being provided to the interpolation circuitry 302.

The interpolated envelope calculation circuitry 310 operates: receive y(n) at the first terminal 312; receive l(m) at the second terminal 314; selectively calculate an envelope value of y(n) (sometimes referred to herein as an interpolated envelope value) responsive to y(n) and l(m); and provide the calculated envelope value of y(n) at the third terminal 316. In some examples, the calculated envelope value of y(n) is given as $|y(n)|^2$. In some examples, l(m) is a control signal that selectively enables the interpolated envelope calculation circuitry 310 responsive to the operations of the peak neighborhood analyzer 110A. l(m) may be used directly with circuitry of the interpolated envelope calculation circuitry 310 if enable/disable is available. As another option, l(m) may be provided to data/clock gating control circuitry (e.g., the data/clock gating control circuitry 432 in FIG. 4) to stop data and/or clocks from being provided to the interpolated envelope calculation circuitry 310.

The peak detection circuitry 318 operates to: receive the envelope value of y(n) at the first terminal 320; receive l(m) at the second terminal 322; selectively compare the envelope value of y(n) to a threshold to obtain comparison results responsive to the envelope value of y(n) and l(m); and provide the comparison results at the third terminal 324. In some examples, the comparison results include a detected peak $y_i$. In some examples, l(m) is a control signal that selectively enables the peak detection circuitry 318 responsive to the operations of the peak neighborhood analyzer 110A. l(m) may be used directly with circuitry of the interpolated envelope calculation circuitry 310 if enable/disable is available. As another option, l(m) may be provided to data/clock gating control circuitry (e.g., the data/clock gating control circuitry 432 in FIG. 4) to stop data and/or clocks from being provided to the interpolated envelope calculation circuitry 310.

The peak cancellation circuitry 380 operates to: receive $y_i$ at the first terminal 382; calculate an envelope value of $y_i$ using the envelope calculation circuitry 346; determine an excess peak portion based on the calculated envelope value of $y_i$ and a peak limit using the excess peak scaling circuitry 116A; scale a complex baseband interpolated sample $y_i$ corresponding to the detected peak responsive to the excess peak portion using the excess peak scaling circuitry 116A to generate a cancellation phasor; scale a peak cancellation waveform responsive to the cancellation phasor to generate a peak cancellation pulse (labeled z(m) herein) using the cancellation pulse generation circuitry 345; and add the peak cancellation pulse to x(m)_DLY using the combine circuitry 364 to produce a corrected input signal.

Specifically, the cancellation phasor control circuitry 114A operates to: receive $y_i$ at the first terminal 342; calculate an envelope value of $y_i$ using the envelope calculation circuitry 346; determine an excess peak portion based on the calculated envelope value of $y_i$ and a peak limit using the excess peak scaling circuitry 116A; scale $y_i$ responsive to the excess peak portion to generate a cancellation phasor using the excess peak scaling circuitry 116A; and provide the cancellation phasor at the second terminal 344. In some examples, the cancellation phasor is given as $\alpha_i e^{j\Phi_i}$, where $e^{j\Phi_i}$ is a phasor, and $\alpha_i$ is a scaling applied to the phasor.

The cancellation pulse generation circuitry 345 operates to: receive the cancellation phasor at the first terminal 347; scale a peak cancellation waveform responsive to the cancellation phasor to generate a peak cancellation pulse z(m); and provide z(m) at the second terminal 349. In some examples, the peak cancellation waveform is stored in a memory of the cancellation pulse generation circuitry 345 for use in generating z(m) responsive to cancellation phasor. In some examples, the peak cancellation waveform is scaled based on peak attributes (e.g., position, amplitude, phase).

The delay circuitry 356 operates to: receive x(m) at the first terminal 358; receive DELAY_CTRL at the second terminal 360; and provided x(m)_DLY at the third terminal 362 responsive to x(m) and DELAY_CTRL. In some examples, DELAY_CTRL is selected or adjusted to account for delays due to the operations of the interpolation circuitry 302, the peak neighborhood analyzer 110A, the interpolated envelope calculation circuitry 310, the peak detection circuitry 318, and/or the peak cancellation circuitry 380.

In some examples, the combine circuitry 364 operates to: receive the peak cancellation pulse z(m) at the first terminal 366; receive x(m)_DLY at the second terminal 368; combine (e.g., add together) z(m) and x(m)_DLY; and provide a corrected transmit signal at the third terminal 370 responsive to the combination of z(m) and x(m)_DLY. In some examples, the peak cancellation circuitry 380 may include multiple peak cancellation resources that operate in parallel. In such examples, each of the peak cancellation resources may include a respective cancellation phasor control circuitry (e.g., the cancellation phasor control circuitry 114A) and respective cancellation pulse generation circuitry (e.g., cancellation pulse generation circuitry 345). Also, a scheduler may be used to manage resource-to-peak allocation to enable each of the peak cancellation resources to service a different detected peak. The cancellation pulses generated by the peak cancellation resources may be provided to the combine circuitry 364. In such examples, the combine circuitry 364 may add the z(m) output from different peak cancellation resources (assigned to different peaks) to x(m)_DLY.

In some examples, the additional CFR stages 372 operate to: receive the corrected transmit signal from the combine circuitry 364 at the first terminal 374; iteratively perform one or more stages of CFR operations on the corrected transmit signal; and provide an iteratively corrected transmit signal at the second terminal 376. For each stage of the additional CFR stages 372, the operations described for the interpolation circuitry 302, the interpolated envelope calculation circuitry 310, the peak neighborhood analyzer 110A, the peak detection circuitry 318, the cancellation phasor control circuitry 114A, the cancellation pulse generation circuitry 345, the delay circuitry 356, and the combine circuitry 364 are repeated. In some examples, peak detection/cancellation is performed using oversampled peak cancellation pulse to address hidden peaks. In different examples, oversampling ratios of 1, 2, 4, and/or 8 may be used for peak detection/cancellation. In some examples, the iteratively corrected transmit signal, resulting from operations of the additional CFR stages 372, is provided to interpolation circuitry (e.g., the interpolation circuitry 220) in preparation of other signal conditioning operations (e.g., DPD correction operations).

FIG. 4 is a diagram showing other example CFR circuitry 400. The CFR circuitry 400 is an example of at least some of the CFR circuitry 108 in FIG. 1, at least some of the CFR circuitry 108A in FIG. 2, or at least some of the CFR circuitry 108B in FIG. 3. As shown, the CFR circuitry 400 includes a tapped delay line, a set of poly-phase filters 408A to 408M, interpolated envelope calculation circuitry 310A, peak detection circuitry 318A, and data/clock gating control circuitry 432. The interpolated envelope calculation circuitry 310A is an example of the interpolated envelope calculation circuitry 310 in FIG. 3. The peak detection circuitry 318A is an example of peak detection circuitry 318 in FIG. 3.

In the example of FIG. 3, the tapped delay line 402 includes a first terminal 404 and a set of second terminals 406A to 406M. The each of the poly-phase filters of the set of poly-phase filters 408A-408M includes a respective terminal of a set of first terminals 410A to 410M, a respective terminal of a set of second terminals 412A to 412M, and a respective terminal of a set of third terminals 414A to 414M. The interpolated envelope calculation circuitry 310A has a set of first terminals 312A to 312M, the second terminal 314, and a set of third terminals 316A to 316M. Each terminal of the set of first terminals 312A to 312M are examples of the first terminal 312 in FIG. 3. Each terminal of the set of third terminals 316A to 316M is an example of the third terminal 316 in FIG. 3. The peak detection circuitry 318A has a set of first terminals 320A to 320M, the second terminal 322, and the third terminal 324. Each terminal of the set of first terminals 320A to 320M is an example of the first terminal 320 in FIG. 3. The data/clock gating control circuitry 430 has a first terminal 434, a set of second terminals 436A to 436M, a third terminal 438, and a fourth terminal 440.

In the example of FIG. 4, each terminal of the set of second terminals 406A to 406M of the tapped delay line 402 is coupled to a respective terminal of the set of first terminals 410A to 410N of the set of poly-phase filters 408A to 408M. Each terminal of the set of second terminals 412A to 412M of the poly-phase filters 408A to 408M is coupled to a respective terminal of the set of second terminals 436A to 436M of the data/clock gating control circuitry 432. Each terminal of the set of third terminals 414A to 414M of the poly-phase filters 408A to 408M is coupled to a respective terminals of the set of first terminals 312A to 312M of the interpolated envelope calculation circuitry 310A. The second terminal 314 of the interpolated envelope calculation circuitry 310A is coupled to the third terminal 438 of the data/clock gating control circuitry 432. Each terminal of the set of third terminal of the interpolated envelope calculation circuitry 310A is coupled to a respect terminal of the set of first terminals 320A to 320M of the peak detection circuitry 318A. The second terminal 322 of the peak detection circuitry 318A is coupled to the fourth terminal 440 of the data/clock gating control circuitry 432.

The data/clock gating control circuitry 432 operates to: receive l(m) at the first terminal 434; provide data/clock signals at the terminals of the set of second terminals 436A to 436M responsive to l(m) indicating a peak; provide data/clock signals at the third terminal 438 responsive to l(m) indicating a peak; and provide data/clock signals at the fourth terminal 440 responsive to l(m) indicating a peak.

The tapped delay line 402 operates to: receive x(m) at the first terminal 404; and provide delayed versions of x(m) to respective terminals of the set of second terminals 406A to 406M. In the example of FIG. 4, the delayed versions of x(m) include x(m−1) to x(m−L), where L is the maximum sample lag related to the poly-phase filters 408A to 408M. The poly-phase filters 408A to 408M operate to: receive the delayed versions of x(m) at respective terminals of the set of first terminals 410A to 410M; selectively receive data/clock signals at respective terminals of the set of second terminals 412A to 412M responsive to the operations of the data/clock gating control circuitry 432 and l(m); and selectively provide interpolated samples (e.g., y(Mm) to y(Mm+M−1)) of x(m) at respective terminals of the set of third terminals 414A to 414M responsive to x(m) and the data/clock signals. In some examples, each terminal of the set of second terminals 406A to 406M of the tapped delay line 402 may include a separate terminal for each of the delayed versions of x(m) output by the tapped delay line 402. Similarly, each terminal of the set of first terminals 410A to 410M of the poly-phase filters 408A to 408M may include a separate terminal for each of the delayed versions of x(m), which are received by each of the poly-phase filters 408A to 408M. In other words, as used herein, a "terminal" may support multiple inputs or outputs in series or in parallel.

The interpolated envelope calculation circuitry 310A operates to: receive the interpolated samples (e.g., y(Mm) to y(Mm+M−1)) of x(m) at the terminals of the set of first terminals 312A to 312M; selectively receive data/clocks at the second terminal 314 responsive to the operations of the data/clock gating control circuitry 432 and l(m); calculate an envelope value for each of the interpolated samples of x(m); and selectively provide the calculated envelope values at respective terminals of the set of third terminals 316A to 316M responsive to the interpolated samples of x(m) and the data/clock signals.

The peak detection circuitry 318A operates to: receive the calculated envelope values at the terminals of the set of first terminals 320A to 320M; receive data/clock signals at the second terminal 322 responsive to the operations of the data/clock gating control circuitry 432 and l(m); selective compare the calculated envelope values to a peak limit to obtain comparison results and the data/clock signals; and selectively provide the comparison results to the third terminal 324 responsive to the comparison results.

Figure 5:
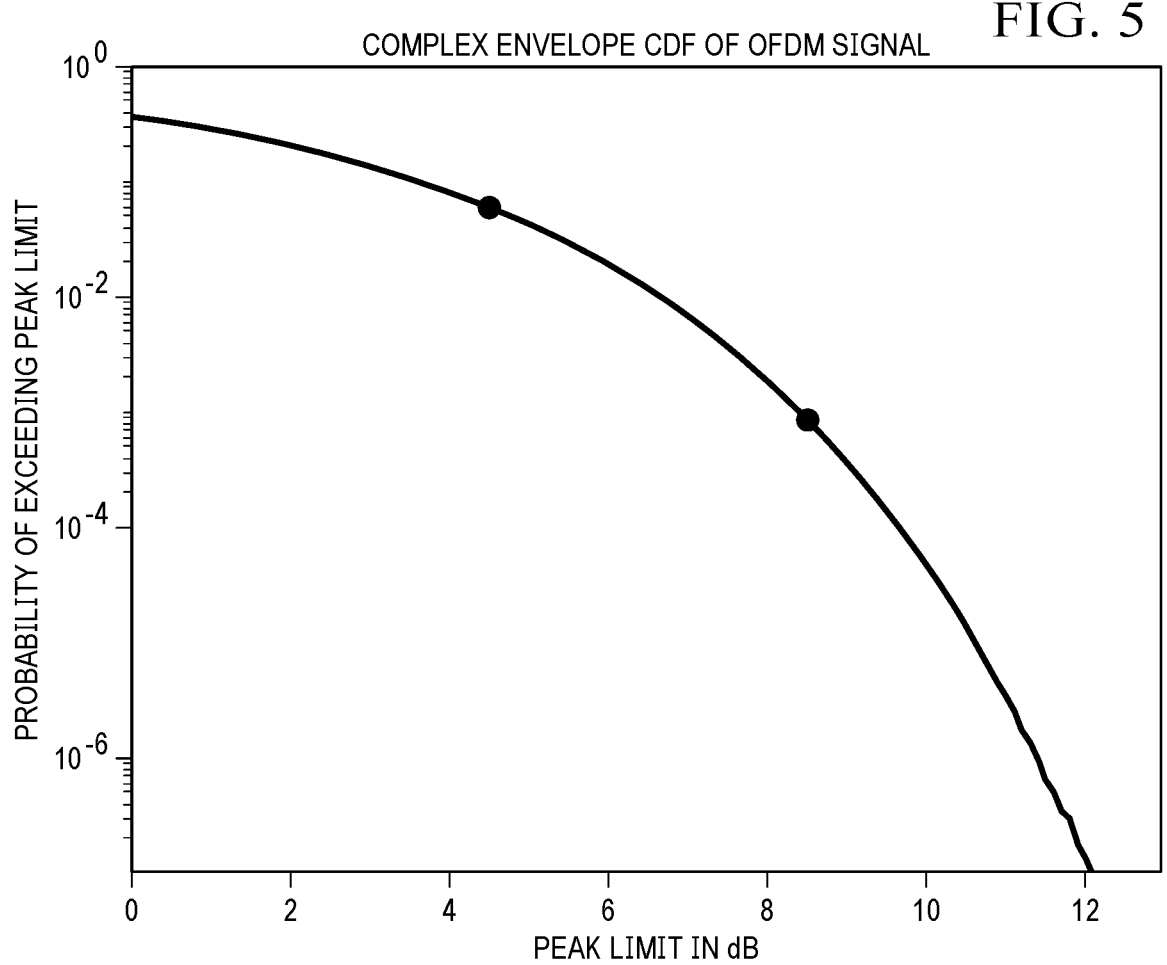
FIG. 5 is a graph showing a complex envelope complementary cumulative distribution function (CCDF) of an orthogonal frequency division multiplexing (OFDM) signal.

FIG. 5 is a graph 500 showing a complex envelope complementary cumulative distribution function (CCDF) of an orthogonal frequency division multiplexing (OFDM) signal. As shown in graph 500, the probability of exceeding a peak limit decreases as the peak limit increases.

Figure 6A:
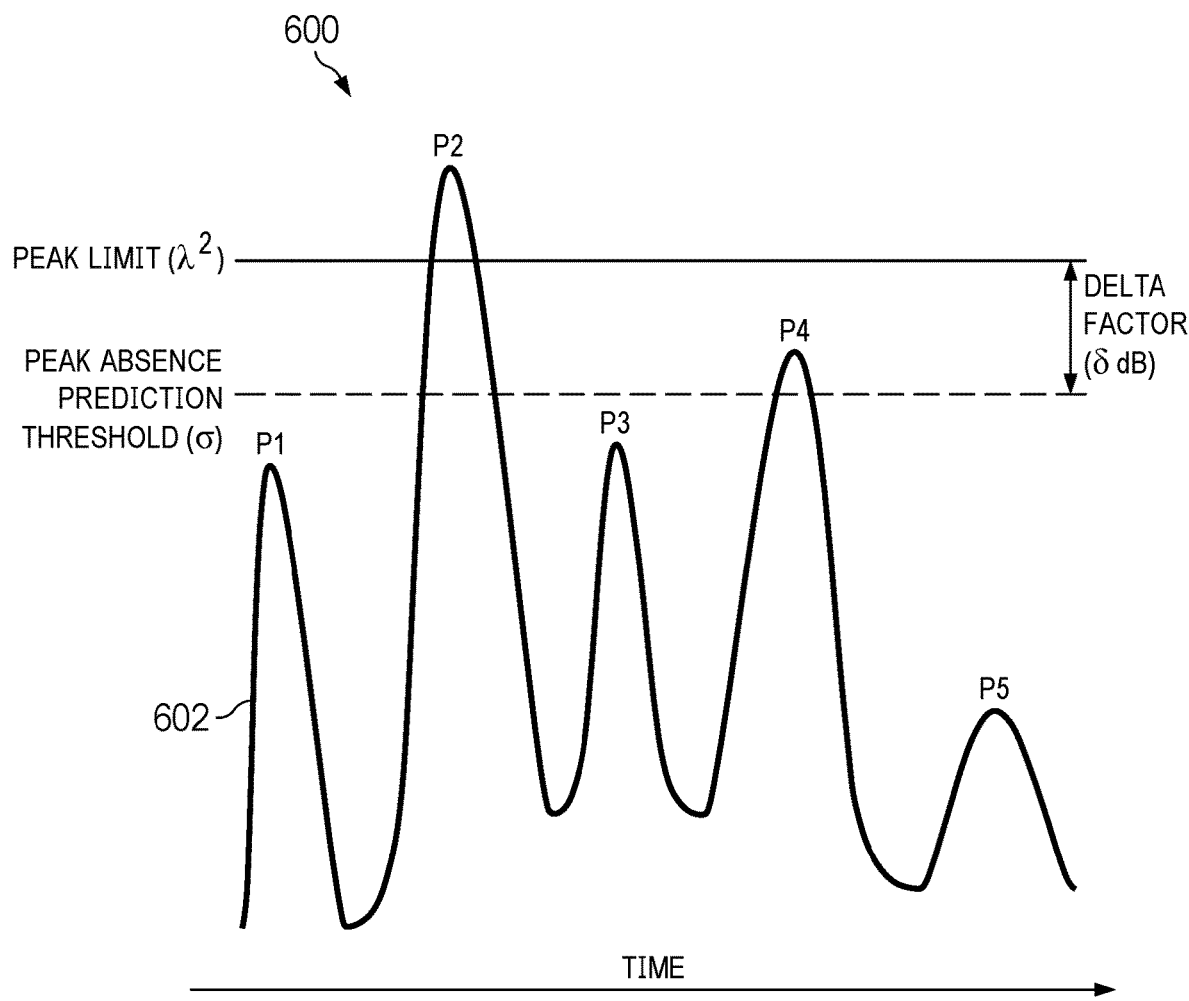
FIG. 6A is a graph showing an example input signal envelope, a peak absence prediction threshold, and a peak limit.

FIG. 6A is a graph 600 showing an example input signal envelope 602, a peak absence prediction threshold, and a peak limit. In the example of FIG. 6A, the value of the input signal envelope 602 varies as a function of time and includes five peaks P1 to P5. In the described examples, the peak absence prediction threshold is used to determine when at least some components of a CFR can be disabled or have their respective data/clocks gated. Based on the graph 600, a peak neighborhood analyzer (e.g., the peak neighborhood analyzer 110 in FIGS. 1 and 2, or the peak neighborhood analyzer 110A in FIG. 3) may determine that P1, P3, and P5 of the input signal envelope 602 are below the peak absence prediction threshold. Accordingly, at least some components of CFR circuitry (e.g., the poly-phase filters 408A to 408M, the interpolated envelope calculation circuitry 310 in FIG. 3, the interpolated envelope calculation circuitry 310A in FIG. 4, the peak detection circuitry 318 in FIG. 3, the peak detection circuitry 318A in FIG. 4, etc.) may be temporarily turned off or have their respective data/clocks temporarily gated. Also, based on the graph 600, peak neighborhood analyzer may determine that P2 and P4 of the input signal envelope 602 are above the peak absence prediction threshold. Accordingly, the CFR circuitry is enabled during the intervals with P2 and P4. In the example of graph 600, P2 is above the peak limit and P4 is below the peak limit. Accordingly, peak cancellation circuitry (e.g., the peak cancellation circuitry 380 in in FIG. 3) may apply a correction to P2 and not P4. As described herein, the correction for P2 may involve: determining an excess peak portion relative to the peak limit; and applying a correction to P2 based on the excess peak portion. In some examples, the correction applied to P2 involves adding a cancellation pulse as described herein.

Figure 6B:
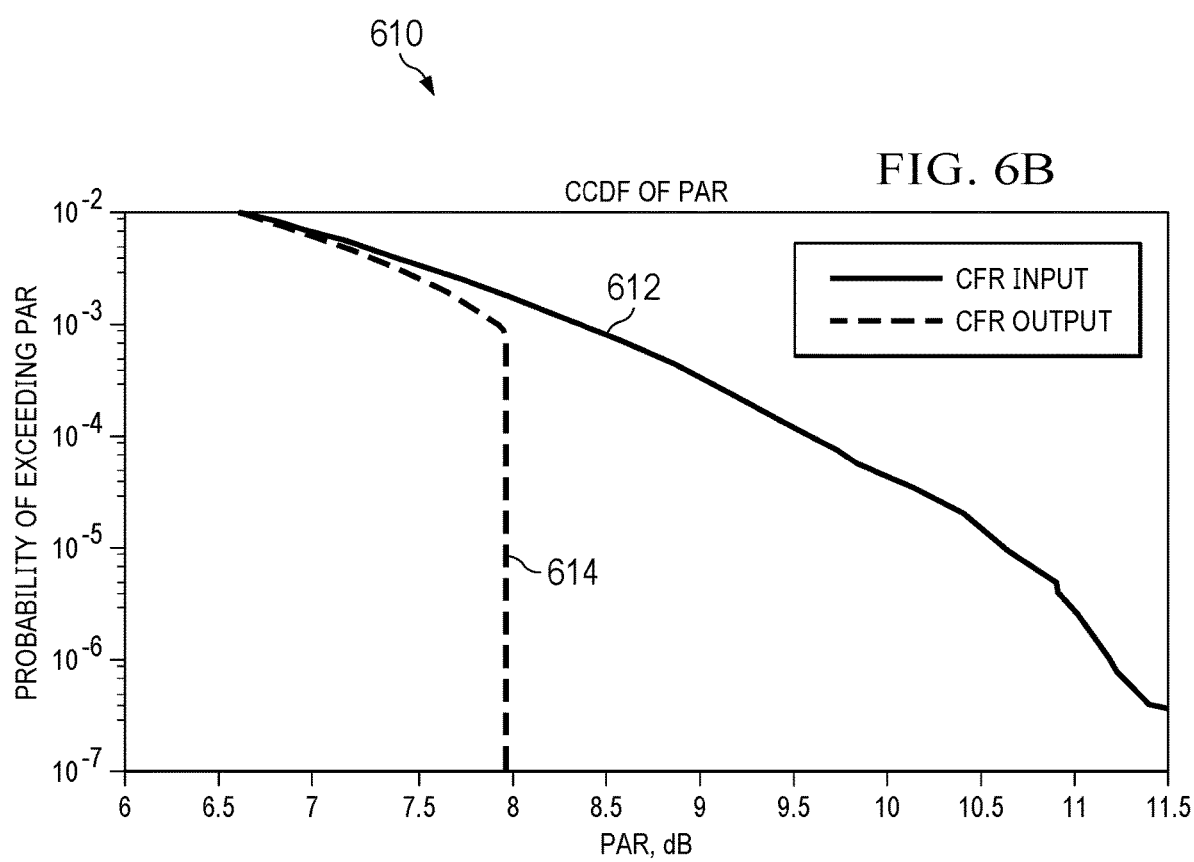
FIG. 6B is a diagram showing an example complementary cumulative distribution function (CCDF) of a peak-to-average ratio (PAR) for a CFR input and a CFR output.

FIG. 6B is a diagram 610 showing an example complementary cumulative distribution function (CCDF) of a peak-to-average ratio (PAR) for a CFR input 612 and a CFR output 614. In the diagram 610, the probably of exceeding PAR for the CFR input 612 decreases as PAR increases. With CFR operations, the PAR of the CFR output 614 can be limited to a target PAR (e.g., 8 dB).

In some examples, the described CFR techniques exploit the sparsity of peaks in 4G/5G transmit signal waveforms and related OFDM modulation, and temporal correlation in magnitude. In an example scenario, only ~0.2% of the input samples exceed a peak limit of 8.5 dB, an example PAR target in 4G/5G wireless base stations. In different examples, the peak absence prediction threshold and the time window duration t may vary. In some examples, the peak absence prediction threshold and the time window duration t are selected to avoid missing peaks while some of the CFR circuitry is in the low power "inactive" state. With the described CFR techniques, significant power savings can be achieved without adding much overhead.

FIG. 7 is a block diagram of example cancellation phasor control circuitry 114B. The cancellation phasor control circuitry 114B is an example of the cancellation phasor control circuitry 114 in FIG. 1, or the cancellation phasor control circuitry 114A in FIG. 3. In the example of FIG. 7, the cancellation phasor control circuitry 114B has the first terminal 342 and the second terminal 344 described in FIG. 3. The cancellation phasor control circuitry 114B includes a delay line 702, the envelope calculation circuitry 346, excess peak calculation circuitry 708, and a multiplier 722. The delay line 702 has a first terminal 704 and a second terminal 706. The envelope calculation circuitry 346 has the first terminal 348 and the second terminal 350 described in FIG. 3. The excess peak calculation circuitry 708 has a first terminal 710, a second terminal 712, and a third terminal 714. The multiplier 722 has a first terminal 724, a second terminal 726, and a third terminal 728.

In the example of FIG. 7, the first terminal 342 of the cancellation phasor control circuitry 114B is coupled to the first terminal of the delay line 702 and to the first terminal 348 of the envelope calculation circuitry 346. The second terminal 350 of the envelope calculation circuitry 346 is coupled to the first terminal of the excess peak calculation circuitry 708. The second terminal 712 of the excess peak calculation circuitry 708 is coupled to a peak limit source (not shown), which provides the peak limit or a related parameter. The peak limit source may be a register or other programmable storage unit. The third terminal 714 of the excess peak calculation circuitry 708 is coupled to a second terminal 726 of the multiplier 722. The first terminal 724 of the multiplier 722 is coupled to the second terminal 706 of the delay line 702. The third terminal 728 of the multiplier 722 is coupled to the second terminal 344 of the cancellation phasor control circuitry 114B.

The delay line 702 operates to: receive a complex baseband interpolated sample $y_i$ corresponding to the detected peak at the first terminal 704; and provide a delayed version of $y_i$ at the second terminal 706. The envelope calculation circuitry 346 operates to: receive $y_i$ at the first terminal 348; calculate an envelope value of $y_i$; and provide the calculated envelope value at the second terminal 350. The excess peak calculation circuitry 708 operates to: receive the calculated envelope value at the first terminal 710; receive the peak limit or related parameter at the second terminal 712; determine an excess peak amount responsive to the calculated envelope value and the peak limit; determine a scaling factor based on the excess peak amount; and provide the scaling factor at the third terminal 316. The multiplier 722 operates to receive the delayed version of the detected peak $y_i$ at the first terminal 724; receive the scaling factor at the second terminal 726; multiply the delayed version of $y_i$ by the scaling factor to generate a cancellation phasor for the detected peak; and provide the cancellation phasor at the third terminal 728. The second terminal 344 of the cancellation phasor control circuitry 114B receives the cancellation phasor.

In some examples, the cancellation phasor control circuitry 114B operates to: perform an envelope calculation for a peak complex baseband interpolated sample $y_i$ (e.g., to determine $|y_i|^2$); calculate the excess peak to determine a scaling factor $\{1-(\lambda/|y_i|)\}$ from $|y_i|^2$ and $\lambda$; and perform scaling of $y_i$ responsive to the scaling factor to generate a cancellation phasor. In some examples, the cancellation phasor is given as $\alpha_i e^{j\Phi_i}$, where $e^{j\Phi_i}$ is the phasor, and $a_i$ is a scaling applied to the phasor.

With the cancellation phasor control circuitry 114B, explicit computation of the phase $\varphi_i$ from the complex sample $y_i$ and sin/cos computations are avoided. In some examples, the scaling factor is determined based on a small look-up table (LUT) to represent the function $f(x)=\sqrt{1/x}$, $\forall x \in [1/16, 1]$. As an option, the function may be coupled with linear interpolation between two adjacent values of the LUT indexed by the quantized value of $|y_i|^2$. After LUT look-up is performed, the output of the function $f(|y_i|^2)$ is multiplied by $\lambda$ and is subtracted from the scaled output $\{\lambda*f(|y_i|^2)\}$ from unity, which reduces complexity compared to computation of the phase $\varphi_i$ from the complex sample $y_i$ and sin/cos computations. With the described examples, power consumption of CFR peak detection is reduced. Also, the modified cancellation phasor computation scheme results in digital area savings. These benefits are achieved without affecting CFR performance.

In some examples, a circuit (e.g., the circuit 100 in FIG. 1) includes CFR circuitry (e.g., the CFR circuitry 108 in FIG. 1, the CFR circuitry 108A in FIG. 2, the CFR circuitry 108B in FIG. 3, of the CFR circuitry 400 in FIG. 4). The CFR circuitry includes: a peak neighborhood analyzer (e.g., the peak neighborhood analyzer 110A in FIG. 3) having a first terminal (e.g., the first terminal 326 in FIG. 3) and a second terminal (e.g., the second terminal 328 in FIG. 3); peak detection circuitry (e.g., the peak detection circuitry 318 in FIG. 3) having a first terminal (e.g., the first terminal 320 in FIG. 3), a second terminal (e.g., the second terminal 322 in FIG. 3), and a third terminal (e.g., the third terminal 324 in FIG. 3); and a controller (e.g., the data/clock gating control circuitry 432 in FIG. 4) having a first terminal (e.g., the first terminal 434 in FIG. 4) and a second terminal (e.g., the fourth terminal 440 in FIG. 4). The first terminal of the controller is coupled to the second terminal of the peak neighborhood analyzer. The second terminal of the controller is coupled to the second terminal of the peak detection circuitry. The peak neighborhood analyzer is configured to: receive an input signal (e.g., x(m) herein) at the first terminal of the peak neighborhood analyzer; analyze the input signal to determine whether a peak larger than a target threshold (e.g., the peak absence prediction threshold herein) is expected within an interval; and provide a first control signal (e.g., l(m) herein) at the second terminal of the peak neighborhood analyzer responsive to determining that a peak larger than the target threshold is expected within the interval. The controller is configured to: receive the first control signal at the first terminal of the controller; and gate a clock or data to the peak detection circuitry responsive to the first control signal.

In some examples, the peak neighborhood analyzer includes envelope calculation circuitry (e.g., the envelope calculation circuitry 330 in FIG. 3) and peak absence prediction circuitry (e.g., the peak absence prediction circuitry 112A in FIG. 3). The envelope calculation circuitry has a first terminal (e.g., the first terminal 332 in FIG. 3) and a second terminal (e.g., the second terminal 334 in FIG. 3). The peak absence prediction circuitry has a first terminal (e.g., the first terminal 338 in FIG. 3) and a second terminal (e.g., the second terminal 340 in FIG. 3). The first terminal of the envelope calculation circuitry is coupled to the first terminal of the peak neighborhood analyzer. The second terminal of the envelope calculation circuitry is coupled to the first terminal of the peak absence prediction circuitry. The second terminal of the peak absence prediction circuitry coupled to the second terminal of the peak neighborhood analyzer.

In some examples, the peak neighborhood analyzer is configured to: receive input signal samples at the first terminal of the peak neighborhood analyzer; analyze the input signal samples to determine whether a peak larger than a target threshold is expected within an interval; and provide a control signal at the second terminal of the peak neighborhood analyzer responsive to determining that a peak larger than the target threshold is not expected within the interval. In some examples, the envelope calculation circuitry is configured to calculate envelope values of the input signal samples, and the peak absence prediction circuitry is configured to: receive the envelope values at the first terminal of the peak absence prediction circuitry; compare the envelope values to the target threshold to obtain comparison results; and provide the control signal at the first terminal of the peak absence prediction circuitry responsive to the comparison results indicating the envelope values stay below the target threshold for at least a threshold number of input signal samples.

In some examples, the envelope calculation circuitry (e.g., the envelope calculation circuitry 330 in FIG. 3) is configured to: receive input signal samples (e.g., x(m) herein) at the first terminal of the envelope calculation circuitry, the input signal samples associated with a baseband interface rate; calculate envelope values (e.g., $|x(m)|^2$ herein) of the input signal samples; and provide the envelope values at the second terminal of the envelope calculation circuitry. In some examples, the peak absence prediction circuitry is configured to: receive the envelope values at the first terminal of the peak absence prediction circuitry; compare the envelope values to the target threshold to obtain comparison results; and provide the first control signal responsive to the comparison results indicating the envelope values stay below the target threshold for at least a threshold number of input signal samples.

In some examples, the controller has a third terminal (e.g., the third terminal 438 in FIG. 4), the CFR circuitry includes interpolated envelope calculation circuitry (e.g., the interpolated envelope calculation circuitry 310 in FIG. 3) having a first terminal (e.g., the first terminal 312 in FIG. 3), a second terminal (e.g., the second terminal 314 in FIG. 3) and a third terminal (e.g., the third terminal 316 in FIG. 3). The second terminal of the interpolated envelope calculation circuitry is coupled to the third terminal of the controller. The third terminal of the interpolated envelope calculation circuitry is coupled to the first terminal of the peak detection circuitry. In such examples, the controller is configured to: receive the first control signal at the first terminal of the controller; and gate a clock or data to the interpolated envelope calculation circuitry responsive to the first control signal.

In some examples, the controller has a fourth terminal (e.g., the set of second terminals 436A to 436M in FIG. 4), and the CFR circuitry includes interpolation circuitry (e.g., the interpolation circuitry 302 in FIG. 3) having a first terminal (e.g., the first terminal 304 in FIG. 3), a second terminal (e.g., the second terminal 306 in FIG. 3) and a third terminal (e.g., the third terminal 308 in FIG. 3). The second terminal of the interpolation circuitry is coupled to the fourth terminal of the controller. The third terminal of the interpolation circuitry is coupled to the first terminal of the interpolated envelope calculation circuitry. In such examples, the controller is configured to: receive the first control signal at the first terminal of the controller; and gate a clock or data to the interpolation circuitry responsive to the first control signal.

In some examples, the fourth terminal of the controller is one terminal of a set of fourth terminals (e.g., the set of second terminals 436A to 436M in FIG. 4). The interpolation circuitry includes a set of poly-phase filters (e.g., the set of poly-phase filters 408A to 408M in FIG. 4). Each poly-phase filter of the set of poly-phase filters has a first terminal (e.g., a respective terminal of the set of first terminals 410A to 410M in FIG. 4), a second terminal (e.g., a respective terminal of the set of second terminals 412A to 412M in FIG. 4), and a third terminal (e.g., a respective terminal of the set of third terminals 414A to 414M in FIG. 4). Each second terminal of each respective poly-phase filter is coupled to a respective terminal of the set of fourth terminals. In such examples, the controller is configured to: receive the first control signal at the first terminal of the controller; and gate a clock or data to each poly-phase filter of the set of poly-phase filters responsive to the first control signal.

In some examples, the CFR circuitry includes peak cancellation circuitry (e.g., the peak cancellation circuitry 380 in FIG. 3) having a first terminal (e.g., the first terminal 382 in FIG. 3), a second terminal (e.g., the second terminal 384 in FIG. 3), and a third terminal (e.g., the third terminal 386 in FIG. 3). In such examples, the first terminal of the peak cancellation circuitry is coupled to the third terminal (e.g., the third terminal 324 in FIG. 3) of the peak detection circuitry. The peak detection circuitry is configured to detect when a peak of the input signal is greater than a peak limit, the peak limit greater than the target threshold. The peak cancellation circuitry is configured to: calculate an excess peak portion of the detected peak relative to the peak limit; and apply a correction to the detected peak based on the excess peak portion. In some examples, applying a correction to the detected peak is based on adding a cancellation pulse to the detected peak.

In some examples, the CFR circuitry includes peak cancellation circuitry (e.g., the peak cancellation circuitry 380 in FIG. 3) having a first terminal (e.g., the first terminal 382 in FIG. 3), a second terminal (e.g., the second terminal 384 in FIG. 3), and a third terminal (e.g., the third terminal 386 in FIG. 3). The first terminal of the peak cancellation circuitry is coupled to the third terminal (e.g., the third terminal 324 in FIG. 3) of the peak detection circuit. The second terminal of the peak cancellation circuitry is coupled to the first terminal (e.g., the first terminal 326 in FIG. 3) of the peak neighborhood analyzer. In such examples, the peak cancellation circuitry may include: envelope calculation circuitry (e.g., the envelope calculation circuitry 346 in FIGS. 3 and 7); excess peak calculation circuitry (e.g., the excess peak calculation circuitry 708 in FIG. 7); a delay line (e.g., the delay line 702 in FIG. 7); and a multiplier (e.g., the multiplier 722 in FIG. 7). The envelope calculation circuitry has a first terminal (e.g., the first terminal 348 in FIGS. 3 and 7) and a second terminal (e.g., the second terminal 350 in FIGS. 3 and 7). The first terminal of the envelope calculation circuitry is coupled to the first terminal of the peak cancellation circuitry. The excess peak calculation circuitry has a first terminal (e.g., the first terminal 710 in FIG. 7) and a second terminal (e.g., the third terminal 714 in FIG. 7). The first terminal of the excess peak calculation circuitry is coupled to the second terminal of the envelope calculation circuitry. The delay line has a first terminal (e.g., the first terminal 704 in FIG. 7) and a second terminal (e.g., the second terminal 706 in FIG. 7). The first terminal of the delay line is coupled to the first terminal of the peak cancellation circuitry. The multiplier has a first terminal (e.g., the first terminal 724 in FIG. 7), a second terminal (e.g., the second terminal 726 in FIG. 7), and a third terminal (e.g., the third terminal 728 in FIG. 7). The first terminal of the multiplier is coupled to the second terminal of the delay line. The second terminal of the multiplier is coupled to the second terminal of the excess peak calculation circuitry.

In some examples, the peak cancellation circuitry includes: delay circuitry (e.g., the delay circuitry 356 in FIG. 3); and combine circuitry (e.g., the combine circuitry 364 in FIG. 3). The delay circuitry has a first terminal (e.g., the first terminal 358 in FIG. 3) and a second terminal (e.g., the third terminal 362 in FIG. 3). The first terminal of the delay circuitry is coupled to the second terminal of the peak cancellation circuitry. The combine circuitry has a first terminal (e.g., the first terminal 366 in FIG. 3), a second terminal (e.g., the second terminal 368 in FIG. 3), and a third terminal (e.g., the third terminal 370 in FIG. 3). The first terminal of the combine circuitry is coupled to the third terminal of the multiplier. The second terminal of the combine circuitry is coupled to the second terminal of the delay circuitry. The third terminal of the combine circuitry is coupled to the third terminal of the peak cancellation circuitry.

In some examples, a transmitter (e.g., the transmitter 102 in FIG. 1, or the transmitter circuitry 208 in FIG. 2) includes CFR circuitry (e.g., the CFR circuitry 108 in FIG. 1, the CFR circuitry 108A in FIG. 2, the CFR circuitry 108B in FIG. 3, of the CFR circuitry 400 in FIG. 4). The CFR circuitry includes: peak detection circuitry (e.g., the peak detection circuitry 318 in FIG. 3); and peak cancellation circuitry (e.g., the peak cancellation circuitry 380 in FIG. 3. The peak detection circuitry has a first terminal (e.g., the first terminal 320 in FIG. 3), a second terminal (e.g., the second terminal 322 in FIG. 3), and a third terminal (e.g., the third terminal 324 in FIG. 3). The peak cancellation circuitry has a first terminal (e.g., the first terminal 382 in FIG. 3), a second terminal (e.g., the second terminal 384 in FIG. 3), and a third terminal (e.g., the third terminal 386 in FIG. 3). The first terminal of the peak cancellation circuitry is coupled to the third terminal of the peak detection circuitry.

In some transmitter examples, the peak cancellation circuitry may include: envelope calculation circuitry (e.g., the envelope calculation circuitry 346 in FIGS. 3 and 7); excess peak calculation circuitry (e.g., the excess peak calculation circuitry 708 in FIG. 7); a delay line (e.g., the delay line 702 in FIG. 7); and a multiplier (e.g., the multiplier 722 in FIG. 7). The envelope calculation circuitry has a first terminal (e.g., the first terminal 348 in FIGS. 3 and 7) and a second terminal (e.g., the second terminal 350 in FIGS. 3 and 7). The first terminal of the envelope calculation circuitry is coupled to the first terminal of the peak cancellation circuitry. The excess peak calculation circuitry has a first terminal (e.g., the first terminal 710 in FIG. 7) and a second terminal (e.g., the third terminal 714 in FIG. 7). The first terminal of the excess peak calculation circuitry is coupled to the second terminal of the envelope calculation circuitry. The delay line has a first terminal (e.g., the first terminal 704 in FIG. 7) and a second terminal (e.g., the second terminal 706 in FIG. 7). The first terminal of the delay line is coupled to the first terminal of the peak cancellation circuitry. The multiplier has a first terminal (e.g., the first terminal 724 in FIG. 7), a second terminal (e.g., the second terminal 726 in FIG. 7), and a third terminal (e.g., the third terminal 728 in FIG. 7). The first terminal of the multiplier is coupled to the second terminal of the delay line. The second terminal of the multiplier is coupled to the second terminal of the excess peak calculation circuitry.

In some transmitter examples, the peak cancellation circuitry includes: cancellation pulse generation circuitry (e.g., the cancellation pulse generation circuitry 345 in FIG. 3); delay circuitry (e.g., the delay circuitry 356 in FIG. 3); and combine circuitry (e.g., the combine circuitry 364 in FIG. 3). The cancellation pulse generation circuitry has a first terminal (e.g., the first terminal 347 in FIG. 3) and a second terminal (e.g., the second terminal 349 in FIG. 3). The first terminal of the cancellation pulse generation circuitry is coupled to the third terminal of the multiplier. The delay circuitry has a first terminal (e.g., the first terminal 358 in FIG. 3) and a second terminal (e.g., the third terminal 362 in FIG. 3). The first terminal of the delay circuitry is coupled to the second terminal of the peak cancellation circuitry. The combine circuitry has a first terminal (e.g., the first terminal 366 in FIG. 3), a second terminal (e.g., the second terminal 368 in FIG. 3), and a third terminal (e.g., the third terminal 370 in FIG. 3). The first terminal of the combine circuitry is coupled to the second terminal of the cancellation pulse generation circuitry. The second terminal of the combine circuitry is coupled to the second terminal of the delay circuitry. The third terminal of the combine circuitry is coupled to the third terminal of the peak cancellation circuitry.

In some transmitter examples, the CFR circuitry includes: a peak neighborhood analyzer (e.g., the peak neighborhood analyzer 110 in FIG. 1, or the peak neighborhood analyzer 110A in FIG. 3); and a controller (e.g., the data/clock gating control circuitry 432 in FIG. 4). The peak neighborhood analyzer has a first terminal (e.g., the first terminal 326 in FIG. 3) and a second terminal (e.g., the second terminal 328 in FIG. 3). The controller has a first terminal (e.g., the first terminal 434 in FIG. 4) and a second terminal (e.g., the fourth terminal 440 in FIG. 4). The first terminal of the controller is coupled to the second terminal of the peak neighborhood analyzer. The second terminal of the controller is coupled to the second terminal of the peak detection circuitry. In some transmitter examples, the peak neighborhood analyzer is configured to: receive input signal samples at the first terminal of the peak neighborhood analyzer;

analyze the input signal samples to determine whether a peak larger than a target threshold is expected within an interval; and provide a control signal at the second terminal of the peak neighborhood analyzer responsive to determining that a peak larger than the target threshold is not expected within the interval.

In some transmitter examples, the peak neighborhood analyzer includes envelope calculation circuitry (e.g., the envelope calculation circuitry 330 in FIG. 3) and peak absence prediction circuitry (e.g., the peak absence prediction circuitry 112 in FIG. 1, or the peak absence prediction circuitry 112A in FIG. 3). The envelope calculation circuitry has a first terminal (e.g., the first terminal 332 in FIG. 3) and second terminal (e.g., the second terminal 334 in FIG. 3). The peak absence prediction circuitry has a first terminal (e.g., the first terminal 338 in FIG. 3) and a second terminal (e.g., the second terminal 340 in FIG. 3). The first terminal of the envelope calculation circuitry is coupled to the first terminal of the peak neighborhood analyzer. The second terminal of the envelope calculation circuitry is coupled to the first terminal of the peak absence prediction circuitry. The second terminal of the peak absence prediction circuitry is coupled to the second terminal of the peak neighborhood analyzer. The envelope calculation circuitry is configured to calculate envelope values of the input signal samples. The peak absence prediction circuitry configured to: receive the envelope values at the first terminal of the peak absence prediction circuitry; compare the envelope values to the target threshold to obtain comparison results; and provide the control signal at the first terminal of the peak absence prediction circuitry responsive to the comparison results indicating the envelope values stay below the target threshold for at least a threshold number of input signal samples.

In some examples, the controller has a third terminal (e.g., the third terminal 438 in FIG. 4), and the CFR circuitry includes interpolated envelope calculation circuitry (e.g., the interpolated envelope calculation circuitry 310 in FIG. 3, or the interpolated envelope calculation circuitry 310A in FIG. 4). The interpolated envelope calculation circuitry has a first terminal (e.g., the first terminal 312 in FIG. 3), a second terminal (e.g., the second terminal 314 in FIG. 3), and a third terminal (e.g., the third terminal 316 in FIG. 3). The second terminal of the interpolated envelope calculation circuitry is coupled to the third terminal of the controller. The third terminal of the interpolated envelope calculation circuitry is coupled to the first terminal of the peak detection circuitry. In such examples, the controller is configured to: receive the control signal at the first terminal of the controller; and gate a clock or data to the interpolated envelope calculation circuitry responsive to the control signal.

In some examples, the controller has a fourth terminal (e.g., the second of second terminals 436A to 436M). The CFR circuitry includes interpolation circuitry (e.g., the interpolation circuitry 302 in FIG. 3, or the poly-phase filters 408A to 408M in FIG. 4). The interpolation circuitry has a first terminal (e.g., the first terminal 304 in FIG. 3, or related set of first terminals 410A to 410M in FIG. 4), a second terminal (e.g., the second terminal 306 in FIG. 3, or the related set of second terminals 412A to 412M in FIG. 4), and a third terminal (e.g., the third terminal 308 in FIG. 3, or the set of third terminals 414A to 414M in FIG. 4). In such examples, the second terminal of the interpolation circuitry is coupled to the fourth terminal of the controller. The third terminal of the interpolation circuitry is coupled to the first terminal of the interpolated envelope calculation circuitry. The controller is configured to: receive the control signal at the first terminal of the controller; and gate a clock or data to the interpolation circuitry responsive to the control signal.

In some examples, the transmitter may be a stand-alone integrated circuit (IC) product or may be part of a larger IC. In some examples, an IC may include the transmitter and a baseband processor that provides transmit data to the transmitter. In some examples, an IC may include the transmitter and analog front-end (AFE) circuitry.

Figure 8:
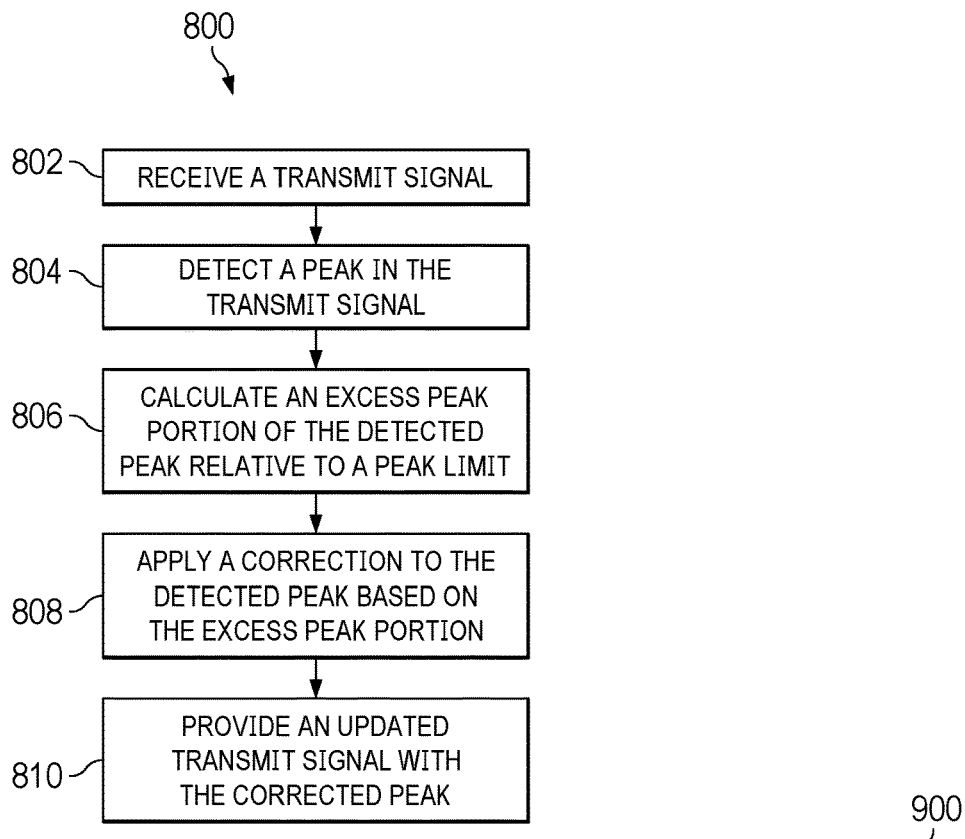
FIGS. 8, 9, and 10 are flowcharts of example CFR methods.
Figure 9:
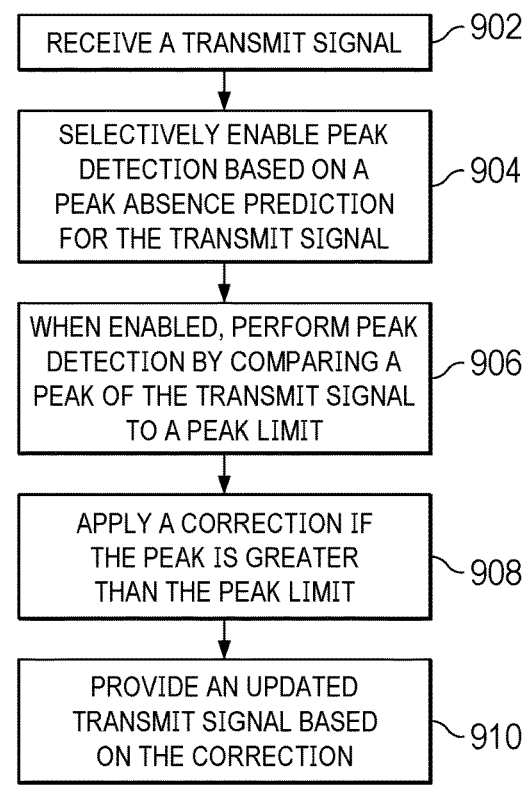
Figure 10:
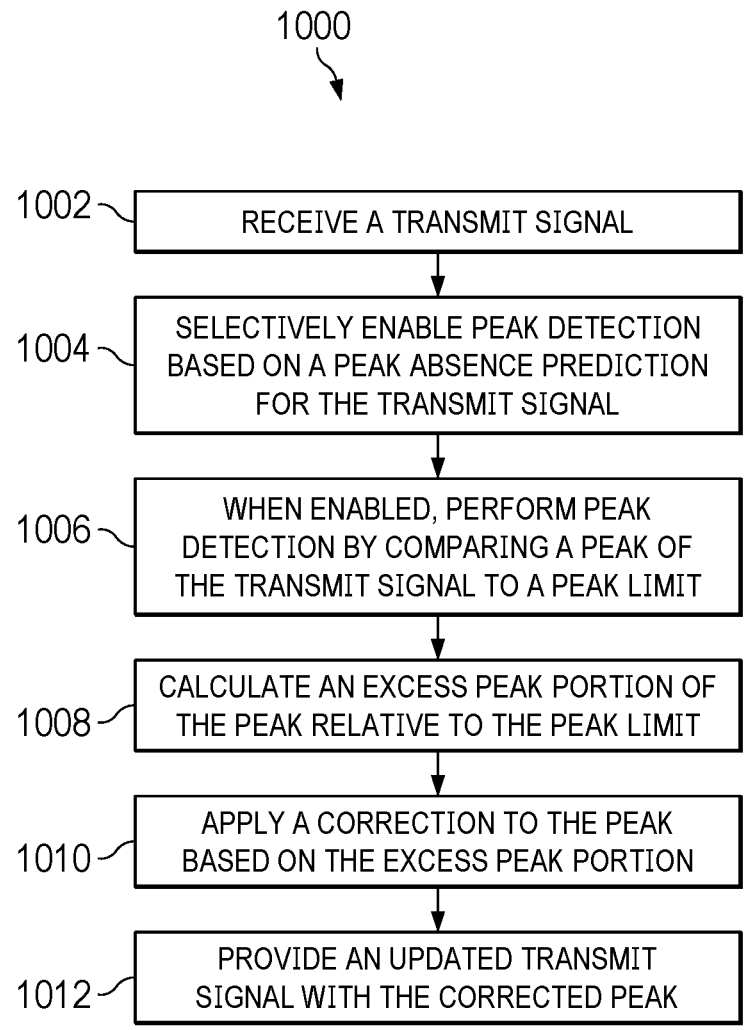

FIGS. 8, 9, and 10 are flowcharts of example CFR methods 800, 900, and 1000. The CFR methods 800, 900, and 1000 may be performed by CFR circuitry (e.g., the CFR circuitry 108 in FIG. 1, the CFR circuitry 108A in 2, the CFR circuitry 108B in FIG. 3, the CFR circuitry 400 in FIG. 4, and/or the cancellation phasor control circuitry 114B in FIG. 7. In FIG. 8, the CFR method 800 includes receiving a transmit signal at block 802. Without limitation, the transmit signal may be a 4G or 5G transmit signal with OFDM modulation. At block 804, a peak is detected in the transmit signal. At block 806, an express peak portion of the detected peak is calculated relative to a peak limit. At block 808, a correction is applied to the detected peak based on the excess peak portion. At block 810, an updated transmit signal with the corrected peak is provided.

In FIG. 9, the CFR method 900 includes receiving a transmit signal at block 902. Without limitation, the transmit signal may be a 4G or 5G transmit signal with OFDM modulation. At block 904, peak detection is selectively enabled based on a peak absence prediction for the transmit signal. When enabled (e.g., in response to peak absence prediction results indicating a peak is expected), peak detection is performed by comparing a peak of the transmit signal to a peak limit at block 906. At block 908, a correction is applied if the detected peak is greater than the peak limit. At block 910, an updated transmit signal based on the correction is provided.

In FIG. 10, the CFR method 1000 includes receiving a transmit signal at block 1002. Without limitation, the transmit signal may be a 4G or 5G transmit signal with OFDM modulation. At block 1004, peak detection is selectively enabled based on a peak absence prediction for the transmit signal. When enabled (e.g., in response to peak absence prediction results indicating a peak is expected), peak detection is performed by comparing a peak of the transmit signal to a peak limit at block 1006. At block 1008, an excess peak portion of the peak relative to the peak limit is calculated. At block 1010, a correction is applied to the peak based on the excess peak portion. At block 1012, an updated transmit signal based on the correction is provided.

In some examples, the calculating the excess peak portion in the CFR methods 800 and 1000 may include: calculating an envelope value for an interpolated transmit signal sample; comparing the envelope value to the peak limit to obtain comparison results; and determine the excess peak portion based on the comparison results. In some examples, performing peak absence detection in CFR methods 900 and 1000 may include: receiving transmit signal samples for an interval of the transmit signal; calculating envelope values for the transmit signal samples; comparing the envelope values to a threshold to obtain comparison results, the threshold less than the peak limit; and in response to the comparison results indicating there is no peak larger than the threshold within the interval, providing a control signal. In such examples, the CFR method 900 and/or the CFR method 1000 may include: disabling peak detection circuitry used to perform the peak detection responsive to the control signal; disabling interpolated envelope calculation circuitry used to provide envelope values to the peak detection circuitry responsive to the control signal; and/or disabling interpolation circuitry used to provide interpolated transmit signal samples to the interpolated envelope calculation circuitry responsive to the control signal.

In some examples, CFR circuitry includes: envelope computation to determine the magnitude of a complex input signal at a baseband interface rate; peak absence prediction that indicates the absence of peaks in the vicinity of the current input sample; and data/clock gating to transition interpolation components and/or CFR components between an active state and an inactive (low power) state responsive to peak absence prediction results. In some examples, peak absence prediction is based on comparing the input signal magnitude against a threshold, which is lower than the peak limit value by an adjustable offset. In some examples, peak absence prediction is based on absence of threshold crossing for an adjustable time interval or window. In some examples, interpolation components (e.g., poly-phase filters), interpolated envelope computation circuitry and peak detection circuitry are transitioned between an active state and an inactive state (e.g., by appropriate data/CLK gating) based on the peak absence prediction results. In some examples, cancellation phasor control includes: calculation of an excess peak portion of a detected peak based on the envelope value of the peak complex baseband interpolated sample and a peak limit; and scaling the peak complex baseband interpolated sample responsive to the excess peak portion to generate a cancellation phasor. In some examples, a peak cancellation waveform is scaled responsive to the cancellation phasor to generate a peak cancellation pulse. The peak cancellation pulse is added to a delayed (latency-matched) version of the transmit signal, resulting in a corrected transmit signal. In some examples, the excess peak portion is calculated based on an inverse square-root computation.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

The invention claimed is:

1. A circuit comprising:
crest factor reduction (CFR) circuitry including:
a peak neighborhood analyzer having a first terminal and a second terminal;
peak detection circuitry having a first terminal, a second terminal, and a third terminal; and
a controller having a first terminal and a second terminal, the first terminal of the controller coupled to the second terminal of the peak neighborhood analyzer, the second terminal of the controller coupled to the second terminal of the peak detection circuitry,
wherein the peak neighborhood analyzer is configured to:
receive an input signal at the first terminal of the peak neighborhood analyzer;

analyze the input signal to determine whether a peak larger than a target threshold is expected within an interval; and provide a first control signal at the second terminal of the peak neighborhood analyzer responsive to determining that a peak larger than the target threshold is expected within the interval, and wherein the controller is configured to:

receive the first control signal at the first terminal of the controller; and gate a clock or data to the peak detection circuitry responsive to the first control signal.

2. The circuit of claim 1, wherein the peak neighborhood analyzer includes envelope calculation circuitry and peak absence prediction circuitry, the envelope calculation circuitry having a first terminal and a second terminal, the peak absence prediction circuitry having a first terminal and a second terminal, the first terminal of the envelope calculation circuitry coupled to the first terminal of the peak neighborhood analyzer, the second terminal of the envelope calculation circuitry coupled to the first terminal of the peak absence prediction circuitry, the second terminal of the peak absence prediction circuitry coupled to the second terminal of the peak neighborhood analyzer.

3. The circuit of claim 2, wherein the envelope calculation circuitry is configured to:

receive input signal samples at the first terminal of the envelope calculation circuitry, the input signal samples associated with a baseband interface rate;

calculate envelope values of the input signal samples; and provide the envelope values at the second terminal of the envelope calculation circuitry.

4. The circuit of claim 3, wherein the peak absence prediction circuitry is configured to:

receive the envelope values at the first terminal of the peak absence prediction circuitry;

compare the envelope values to the target threshold to obtain comparison results; and provide the first control signal responsive to the comparison results indicating the envelope values stay below the target threshold for at least a threshold number of input signal samples.

5. The circuit of claim 1, wherein the controller has a third terminal, the CFR circuitry includes interpolated envelope calculation circuitry having a first terminal, a second terminal, and a third terminal, the second terminal of the interpolated envelope calculation circuitry coupled to the third terminal of the controller, the third terminal of the interpolated envelope calculation circuitry coupled to the first terminal of the peak detection circuitry, and the controller is configured to:

receive the first control signal at the first terminal of the controller; and gate a clock or data to the interpolated envelope calculation circuitry responsive to the first control signal.

6. The circuit of claim 5, wherein the controller has a fourth terminal, the CFR circuitry includes interpolation circuitry having a first terminal, a second terminal, and a third terminal, the second terminal of the interpolation circuitry coupled to the fourth terminal of the controller, the third terminal of the interpolation circuitry coupled to the first terminal of the interpolated envelope calculation circuitry, and the controller is configured to:

receive the first control signal at the first terminal of the controller; and gate a clock or data to the interpolation circuitry responsive to the first control signal.

7. The circuit of claim 6, wherein the fourth terminal of the controller is one terminal of a set of fourth terminals of the controller, the interpolation circuitry includes a set of poly-phase filters, each poly-phase filter of the set of poly-phase filters having a first terminal, a second terminal, and a third terminal, each second terminal of each respective poly-phase filter coupled to a respective terminal of the set of fourth terminals, and the controller is configured to:

receive the first control signal at the first terminal of the controller; and gate a clock or data to each poly-phase filter of the set of poly-phase filters responsive to the first control signal.

8. The circuit of claim 1, wherein the CFR circuitry includes peak cancellation circuitry having a first terminal, a second terminal, and a third terminal, the first terminal of the peak cancellation circuitry is coupled to the third terminal of the peak detection circuitry, the peak detection circuitry is configured to detect when a peak of the input signal is greater than a peak limit, the peak limit greater than the target threshold, and the peak cancellation circuitry is configured to:

calculate an excess peak portion of the detected peak relative to the peak limit; and apply a correction to the detected peak based on the excess peak portion.

9. The circuit of claim 1, wherein the CFR circuitry includes peak cancellation circuitry having a first terminal, a second terminal, and a third terminal, the first terminal of the peak cancellation circuitry coupled to the third terminal of the peak detection circuitry, the second terminal of the peak cancellation circuitry coupled to the first terminal of the peak neighborhood analyzer, and the peak cancellation circuitry including:

envelope calculation circuitry having a first terminal and a second terminal, the first terminal of the envelope calculation circuitry coupled to the first terminal of the peak cancellation circuitry;

excess peak calculation circuitry having a first terminal and a second terminal, the first terminal of the excess peak calculation circuitry coupled to the second terminal of the envelope calculation circuitry;

a delay line having a first terminal and a second terminal, the first terminal of the delay line coupled to the first terminal of the peak cancellation circuitry; and a multiplier having a first terminal, a second terminal, and a third terminal, the first terminal of the multiplier coupled to the second terminal of the delay line, the second terminal of the multiplier coupled to the second terminal of the excess peak calculation circuitry.

10. The circuit of claim 9, wherein the peak cancellation circuitry includes:

cancellation pulse generation circuitry having a first terminal and a second terminal, the first terminal of the cancellation pulse generation circuitry coupled to the third terminal of the multiplier;

delay circuitry having a first terminal and a second terminal, the first terminal of the delay circuitry coupled to the second terminal of the peak cancellation circuitry; and combine circuitry having a first terminal, a second terminal, and a third terminal, the first terminal of the combine circuitry coupled to the second terminal of the cancellation pulse generation circuitry, the second terminal of the combine circuitry coupled to the second terminal of the delay circuitry, and the third terminal of the combine circuitry coupled to the third terminal of the peak cancellation circuitry.

11. A transmitter comprising:
crest factor reduction (CFR) circuitry including:
peak detection circuitry having a first terminal, a second terminal, and a third terminal; and
peak cancellation circuitry having a first terminal, a second terminal, and a third terminal, the first terminal of the peak cancellation circuitry coupled to the third terminal of the peak detection circuitry, the peak cancellation circuitry including:
envelope calculation circuitry having a first terminal and a second terminal, the first terminal of the envelope calculation circuitry coupled to the first terminal of the peak cancellation circuitry;
excess peak calculation circuitry having a first terminal and a second terminal, the first terminal of the excess peak calculation circuitry coupled to the second terminal of the envelope calculation circuitry;
a delay line having a first terminal and a second terminal, the first terminal of the delay line coupled to the first terminal of the peak cancellation circuitry; and
a multiplier having a first terminal, a second terminal, and a third terminal, the first terminal of the multiplier coupled to the second terminal of the delay line, the second terminal of the multiplier coupled to the second terminal of the excess peak calculation circuitry.

12. The transmitter of claim 11, wherein the peak cancellation circuitry includes:
cancellation pulse generation circuitry having a first terminal and a second terminal, the first terminal of the cancellation pulse generation circuitry coupled to the third terminal of the multiplier;
delay circuitry having a first terminal and a second terminal, the first terminal of the delay circuitry coupled to the second terminal of the peak cancellation circuitry; and
combine circuitry having a first terminal, a second terminal, and a third terminal, the first terminal of the combine circuitry coupled to the second terminal of the cancellation pulse generation circuitry, the second terminal of the combine circuitry coupled to the second terminal of the delay circuitry, and the third terminal of the combine circuitry coupled to the third terminal of the peak cancellation circuitry.

13. The transmitter of claim 11, wherein the CFR circuitry includes:
a peak neighborhood analyzer having a first terminal and a second terminal; and
a controller having a first terminal and a second terminal, the first terminal of the controller coupled to the second terminal of the peak neighborhood analyzer, the second terminal of the controller coupled to the second terminal of the peak detection circuitry, the peak neighborhood analyzer configured to:
receive input signal samples at the first terminal of the peak neighborhood analyzer;
analyze the input signal samples to determine whether a peak larger than a target threshold is expected within an interval; and
provide a control signal at the second terminal of the peak neighborhood analyzer responsive to determining that a peak larger than the target threshold is not expected within the interval.

14. The transmitter of claim 13, wherein the peak neighborhood analyzer includes envelope calculation circuitry and peak absence prediction circuitry, the envelope calculation circuitry having a first terminal and second terminal, the peak absence prediction circuitry having a first terminal and a second terminal, the first terminal of the envelope calculation circuitry coupled to the first terminal of the peak neighborhood analyzer, the second terminal of the envelope calculation circuitry coupled to the first terminal of the peak absence prediction circuitry, the second terminal of the peak absence prediction circuitry coupled to the second terminal of the peak neighborhood analyzer, the envelope calculation circuitry configured to calculate envelope values of the input signal samples, and the peak absence prediction circuitry configured to:
receive the envelope values at the first terminal of the peak absence prediction circuitry;
compare the envelope values to the target threshold to obtain comparison results; and
provide the control signal at the first terminal of the peak absence prediction circuitry responsive to the comparison results indicating the envelope values stay below the target threshold for at least a threshold number of input signal samples.

15. The transmitter of claim 13, wherein the controller has a third terminal, the CFR circuit further comprises interpolated envelope calculation circuitry having a first terminal, a second terminal, and a third terminal, the second terminal of the interpolated envelope calculation circuitry coupled to the third terminal of the controller, the third terminal of the interpolated envelope calculation circuitry coupled to the first terminal of the peak detection circuitry, and the controller is configured to:
receive the control signal at the first terminal of the controller; and
gate a clock or data to the interpolated envelope calculation circuitry responsive to the control signal.

16. The transmitter of claim 15, wherein the controller has a fourth terminal, the CFR circuitry includes interpolation circuitry having a first terminal, a second terminal, and a third terminal, the second terminal of the interpolation circuitry coupled to the fourth terminal of the controller, the third terminal of the interpolation circuitry coupled to the first terminal of the interpolated envelope calculation circuitry, and the controller is configured to:
receive the control signal at the first terminal of the controller; and
gate a clock or data to the interpolation circuitry responsive to the control signal.

17. A method comprising:
receiving a transmit signal;
selectively enabling peak detection based on a peak absence prediction for the transmit signal;
when enabled, performing peak detection by comparing a peak of the transmit signal to a peak limit;
calculating an excess peak portion of the peak relative to the peak limit;
applying a correction to the peak based on the excess peak portion; and
providing an updated transmit signal with the corrected peak.

18. The method of claim 17, wherein calculating the excess peak portion includes:
calculating an envelope value for an interpolated transmit signal sample;
comparing the envelope value to the peak limit to obtain comparison results; and
determine the excess peak portion based on the comparison results.

19. The method of claim 17, wherein performing peak absence detection includes:
- receiving transmit signal samples for an interval of the transmit signal;
- calculating envelope values for the transmit signal samples;
- comparing the envelope values to a threshold to obtain comparison results, the threshold less than the peak limit; and
- in response to the comparison results indicating there is no peak larger than the threshold within the interval, providing a control signal, and
- the method further comprises disabling peak detection circuitry used to perform the peak detection responsive to the control signal.

20. The method of claim 19, further comprising disabling interpolated envelope calculation circuitry used to provide envelope values to the peak detection circuitry responsive to the control signal.

* * * * *